US012587543B2

(12) United States Patent
Chandrasekaran

(10) Patent No.: US 12,587,543 B2
(45) Date of Patent: Mar. 24, 2026

(54) SYSTEM AND METHOD FOR DYNAMIC MULTI-PARTY VERIFICATION OF GENERATIVE ARTIFICIAL INTELLIGENCE SYSTEMS

(71) Applicant: KPMG LLP, New York, NY (US)

(72) Inventor: Swaminathan Chandrasekaran, Coppell, TX (US)

(73) Assignee: KPMG LLP, New York, NY (US)

( * ) Notice: Subject to any disclaimer, the term of this patent is extended or adjusted under 35 U.S.C. 154(b) by 0 days.

(21) Appl. No.: 19/270,726

(22) Filed: Jul. 16, 2025

(65) Prior Publication Data

US 2026/0025388 A1      Jan. 22, 2026

Related U.S. Application Data

(60) Provisional application No. 63/672,148, filed on Jul. 16, 2024.

(51) Int. Cl.
*H04L 9/40* (2022.01)
*H04L 9/00* (2022.01)
(52) U.S. Cl.
CPC .............. *H04L 63/126* (2013.01); *H04L 9/50* (2022.05)

(58) Field of Classification Search
CPC ............................... H04L 63/126; H04L 9/50
See application file for complete search history.

(56) References Cited

U.S. PATENT DOCUMENTS

2021/0264520 A1* 8/2021 Cummings ............ G06Q 40/12
2023/0269272 A1* 8/2023 Dambrot ............. H04L 63/1466
                                                                726/22

* cited by examiner

*Primary Examiner* — Matthew T Henning
(74) *Attorney, Agent, or Firm* — Nelson Mullins Riley & Scarborough LLP; Anthony A. Laurentano

(57) ABSTRACT

A model verification system and associated method for employing a multi-party verification technique to verify machine learning models and generative AI systems. The models and associated systems can be deployed in an enterprise and require verification to ensure that cohorts are properly verifying the models and systems and evaluation to ensure that the models and systems operate responsibly and achieve intended outcomes. A dynamic, multi-stakeholder blinded verification process can be employed for the continuous verification and evaluation of machine learning models and the systems that use them. This helps promote unbiased, reproducible verification, evaluation and assessments by preventing potential biases from cohorts form part of the verification process.

24 Claims, 3 Drawing Sheets

| AI-MODEL-SYSTEM | | |
|---|---|---|
| Model-ID | string | Unique identifier |
| Name | string | |
| Description | string | |
| Purpose | string | |
| Owner | string | |
| Classification | string | |
| Current-Version | string | |
| Deployment-Date | date | |
| First-Trained-Date | date | |
| Last-Trained-Date | date | |
| Status | string | |

SYSTEM AND METHOD FOR DYNAMIC MULTI-PARTY VERIFICATION OF GENERATIVE ARTIFICIAL INTELLIGENCE SYSTEMS

RELATED APPLICATION

The present application claims priority to U.S. provisional patent application Ser. No. 63/672,148, filed on Jul. 16, 2024, and entitled System and Method for Dynamic Multi-Party Verification of Generative Language Models, the contents of which are herein incorporated by reference.

BACKGROUND OF THE INVENTION

The present invention is related to systems and methods for verifying generative language models, and more particularly relates to verification systems and methods for verifying and evaluating generative language models.

Conventional generative language models, such as those based on deep learning architectures (e.g., GPT-3, GPT-4), are designed to produce human-like text by predicting the likelihood of sequences of words. The conventional models have seen widespread use in various applications, including natural language processing, automated content generation, knowledge assistants, artificial intelligence agents, and conversational agents. Ensuring the accuracy, reliability, and appropriateness of the outputs generated by these models is important for their effective deployment.

According to one conventional verification method, subject matter experts or target users can manually review the outputs of the generative language models. The users can assess selected aspects of the models, such as fluency, relevance, coherence, and factual accuracy. The human manual approach to verifying the generative language models often involves large-scale user studies or specialized panels. The human evaluation approach to verifying generative language models, while valuable for its direct insights into model construction and performance, has several notable disadvantages. First, the human evaluation approach typically employs a single person to perform the model verification. This can be time consuming and ineffective if a reasonable number of models need to be verified by the evaluator. Second, the human manual approach is inherently subjective. Different evaluators may have varying opinions on the quality of the generated model output (e.g., text), leading to inconsistent results. Further, personal biases and individual preferences can affect the user assessments, thus making it difficult to establish a uniform standard for evaluation the models. Third, the human manual approach is time-consuming and labor-intensive, thus making it impractical for large-scale or continuous assessment of generative language models.

In response to the drawbacks of the human manual approach, automated verification and evaluation processes and approaches were developed to assess the construction of the model and the quality of text generated by the generative language models. The automated approaches can employ selected metrics when assessing or verifying the performance of the models. The automated metrics employed by the automated approaches can include the BLEU (Bilingual Evaluation Understudy) approach for measuring the overlap between the generated text and reference text based on n-grams. The automated approaches can also include the ROUGE (Recall-Oriented Understudy for Gisting Evaluation) approach for evaluating the quality of summaries by comparing them to reference summaries using recall-based measures. Other approaches and associated metrics include METEOR (Metric for Evaluation of Translation with Explicit Ordering) that considers synonymy and stemming along with precision and recall, and Perplexity for measuring the uncertainty of the language model in predicting a sample, with lower perplexity indicating better performance.

Other conventional approaches include adversarial testing that involves generating adversarial examples that are designed to trick the generative language models into producing incorrect or undesirable outputs. The goal of adversarial testing is to identify weaknesses and improve the robustness of the model. Other conventional approaches can include evaluating whether the generated text maintains logical consistency and coherence over long passages (e.g., consistency check), as well as domain specific testing for testing the models to ensure that the models meet the required standards for the domains.

Similar to the human manual approach, drawbacks exist with the other verification techniques. With regard to the automated metric approach, metrics like BLEU and ROUGE focus primarily on surface-level text similarities and do not fully capture deeper aspects such as semantic meaning or creativity. Further, the approaches are less effective for evaluating open-ended generative tasks where there are multiple valid outputs, and may fail to account for context, leading to misleading scores for texts that are contextually appropriate but lexically different from references.

Further, traditional verification methods fall short since they are overly complex and employ diverse factors, such as geolocation, context, and oftentimes have to adhere to local regulations. Conventional approaches may also not fully account for the complexity of real-world artificial intelligence systems that operate under diverse and changing conditions across locations, contexts and regulatory environments over time. Without sufficient transparency into evaluation methodologies and participants, it can be difficult to assess verification results and trust model performance. Additional concerns include potential conflicts of interest as parties responsible for model development oftentimes oversee verification of the model, further jeopardizing trust in the model results.

SUMMARY OF THE INVENTION

The present invention is directed to a model verification system and associated method for employing a multi-party verification technique to verify generative language models. The generative language models and associated systems and agents are increasingly deployed in regulated and safety-critical domains and require verification to ensure that that raters or cohorts are properly verifying the models and systems and evaluation to ensure that the models operate responsibly and achieve intended outcomes. The approach of the present invention can include a dynamic, multi-stakeholder blinded verification process for the continuous verification and evaluation of machine learning models, such as generative language models, and the systems that use them. The approach of the present invention aims to promote unbiased, reproducible verification, evaluation and assessments by preventing potential biases between evaluators and subjects of evaluation. The method also accommodates testing of the machine learning models and systems under diverse operating conditions to establish trust in the underlying systems that employ the models.

The present invention proposes a system and method for continuous blinded verification of machine learning models and associated generative artificial intelligence systems under real-world conditions that changes temporally and geographically by applying a multi-sided blinded verification protocol to continuously assess and verify machine learning models and systems. The verification method can include selecting verification participants (e.g., independent reviewers or evaluators) and usage participants of the system based on multi-factorial attributes, including but not limited to industry domain, skills, locale, expertise, primary language, years of experience, and the like. The present invention also considers the context, geolocation, circumstances, geo-specific regulations, and the environment in which the models run. The blinded review and verification process hides reviewer or evaluator identities and details from each other to promote independent and unbiased review of the models and systems. By employing multiple blinded parties during the verification process, the present invention improves the model and system validation and verification by preventing bias and influence from any one source.

The present invention can employ statistical metrics such as a blinding index and inter-rater reliability scores to validate the verification process so as to ensure that the verification process remains objective and consistent. Model performance can also be tracked longitudinally through the generation and use of model or system trust cards that can be configured to capture a changing time-series of results of the models and systems. Multiple evaluation rounds can optionally be performed with different reviewers or evaluators.

The present invention further evaluates the machine learning models and systems in a number of different areas. According to one embodiment, the model or system areas associated with the enterprise can include fairness, transparency, explainability, accountability, data integrity, reliability, security, safety, privacy, and sustainability. The present invention also includes verification of generative language models and systems using the foregoing, including checks for hallucination, toxicity, perplexity, training data pollution, and the like.

According to the present invention, the reviewers or evaluators (e.g., cohorts) can independently evaluate the models and systems based on a selected set of criteria. The evaluator ratings for each criteria can be collected, but not revealed, to determine an inter-rater reliability statistic or score, such as a Cohen's Kappa. A high reliability score suggests consistent evaluations. The blinded verification process can also track and report a blinding index statistic to quantitatively measure the degree to which reviewers and model details are effectively blinded from each other. A high blinding index indicates independence between the two. The models and systems can also be evaluated under different operating scenarios, contexts, geographic locations, temporal conditions (e.g. time of day/week), regulatory environments, and the like, to evaluate the model robustness and adaptability over time. Further, the models undergoing verification can be reviewed in multiple rounds by different reviewer panels selected randomly based on their attributes. Comparing blinding index and inter-rater reliability scores across the different rounds can validate or verify independence and enhance the reproducibility of the model results. The verification process can also collect confidence scores from reviewers on different model review aspects or parameters. Consistency in confidence levels, as measured by inter-rater score agreement, can lend credibility to the review results. The storing of the verification provenance, intermediate results, and final outcomes on a distributed ledger, such as a blockchain, can ensure permanent record, auditability and trust of the verification results.

The present invention is directed to a computer-implemented model verification system for verifying and evaluating a machine learning model in an enterprise. The model verification system can include a model aggregation unit for aggregating together a plurality of the machine learning models associated with the enterprise, wherein each of the plurality of machine learning models have metadata associated therewith, and a cohort determination unit for determining and selecting a plurality of cohorts from a set of cohorts according to one or more cohort attributes to perform a verification process on one or more of the plurality of machine learning models to verify the one or more machine learning models and to generate cohort verification data. The plurality of cohorts are blinded relative to each other, and the cohort determination unit generates output cohort data indicative of the plurality of cohorts. The system also includes an objective assessment unit for assessing a consistency between the plurality of cohorts when verifying one or more of the plurality of machine learning models based on the cohort verification data and the output cohort data and generating an assessment score that is indicative of a selected level of consistency of the cohort verification data between the plurality of cohorts, a model evaluation unit for applying an evaluation process to the assessment score and to model evaluation data for evaluating a performance of the machine learning model and for generating output model evaluation data indicative of the evaluation of the performance of the machine learning model, and a result assessment unit for receiving and processing the output model evaluation data and for automatically assessing the performance and reliability of the machine learning model based on the output model evaluation data and for generating assessment results. The system can further include a digital trust infrastructure having a blockchain for storing the machine learning models and associated metadata, the plurality of cohorts and output cohort data, the assessment score, the output model evaluation data, and the assessment results, and a model trust card generation unit for generating a model trust card from selected data stored in the digital trust infrastructure. The model trust card sets forth model specific information of the machine learning models that are verified and evaluated.

The model aggregation unit can include a storage unit for storing the machine learning models and associated metadata. The cohort determination unit can include a cohort storage unit for storing the set of cohorts and the cohort attributes, and a cohort selection unit for selecting the plurality of cohorts from the set of cohorts based on the cohort attributes, wherein the cohort attributes are selected from a total set of cohort attributes. The cohort selection unit includes an attribute data extraction unit for applying an analytical technique to input data for extracting the cohort attributes from the input data to form the total set of cohort attributes, an attribute ranking unit for ranking the total set of cohort attributes based on selection criteria, wherein the attribute ranking unit generates ranked cohort attribute data, an attribute determination unit for determining the plurality of cohort attributes from the total set of cohort attributes based on the ranked cohort attribute data, and a selection unit for selecting the plurality of cohorts from the total set of cohorts based on the plurality of cohort attributes. Further, the cohort selection unit can be configured for selecting the plurality of cohorts based on a predefined set of cohort attributes.

The objective assessment unit of the model verification system can include a statistical measurement unit for applying one or more statistical measuring techniques to one or more of the output cohort data and the cohort verification data to generate the assessment score. For example, the statistical measurement unit can apply a blind-index technique to one or more of the output cohort data and the cohort verification data to determine the assessment score. The blind-index technique can employ a blind dataset to evaluate the machine learning model. Alternatively, the statistical measurement unit can apply an inter-rater reliability (IRR) technique to the output cohort data and the cohort verification data to assess a level of agreement among the plurality of cohorts.

Further, the model evaluation unit of the model verification system can include an evaluation determination unit for evaluating the machine learning model based on the model evaluation data. The model evaluation data includes one or more of evaluation ground truth data, test harness data, benchmark data, and threshold setting data. The evaluation determination unit compares predictions generated by the machine learning model with the evaluation ground truth data to identify incorrect model predictions. The evaluation determination unit can also optionally analyze incorrect model predictions generated by the machine learning model to determine if the machine learning model is generating erroneous predictions. The evaluation ground truth data can include labeled data that is free from errors. The evaluation determination unit can be configured to evaluate the machine learning model by testing a performance of the machine learning model based on the test harness data. Still further, the evaluation determination unit can be configured to assess an effectiveness of the machine learning model and compare the model with one or more other machine learning models based on benchmark data. According to one embodiment, the evaluation determination unit can optionally include a parameter application unit for applying one or more enterprise parameters and one or more of the evaluation ground truth data, the scenario-based test harness data, the benchmark data, and the threshold setting data, to the assessment score generated by the objective assessment unit so as to evaluate the performance of the machine learning model.

The result assessment unit of the model verification system can include one or more of an independent evaluation unit for independently evaluating the performance of the machine learning model based on the output model evaluation data using a separate dataset to ensure reliable results of the machine learning model, a scenario evaluation unit for assessing the performance of the machine learning model under one or more predefined scenarios that simulate real time scenarios, a peer evaluation unit for assessing the output model evaluation data by one or more peers with selected expertise to identify bias or error in an output of the machine learning model, a peer comparison unit for assessing the performance of the machine learning model by comparing the output of the machine learning model to outputs of one or more other machine learning models, and an inter-rater arbitration unit for evaluating the machine learning model to resolve inconsistencies in ratings of the machine learning model by different cohorts using an inter-rater technique.

The present invention is also directed to a computer-implemented method for verifying and evaluating a machine learning model in an enterprise, comprising aggregating together with a model aggregation unit a plurality of the machine learning models associated with the enterprise, wherein each of the plurality of machine learning models have metadata associated therewith, and determining and selecting with a cohort determination unit a plurality of cohorts from a set of cohorts according to one or more cohort attributes to perform a verification process on one or more of the plurality of machine learning models to verify the one or more machine learning models and to generate cohort verification data, where the plurality of cohorts are blinded relative to each other, and then generating output cohort data indicative of the plurality of cohorts. The method also includes assessing with an objective assessment unit a consistency between the plurality of cohorts when verifying one or more of the plurality of machine learning models based on the cohort verification data and the output cohort data and generating an assessment score that is indicative of a selected level of consistency of the cohort verification data between the plurality of cohorts, and applying with a model evaluation unit an evaluation process to the assessment score and to model evaluation data for evaluating a performance of the machine learning model and for generating output model evaluate on data indicative of the evaluation of the performance of the machine learning model. The method further includes receiving and processing with a result assessment unit the output model evaluation data and for automatically assessing the performance and reliability of the machine learning model based on the output model evaluation data and for generating assessment results, storing in a digital trust infrastructure having a blockchain the machine learning models and associated metadata, the plurality of cohorts and output cohort data, the assessment score, the output model evaluation data, and the assessment results, and generating with a model trust card generation unit a model trust card from selected data stored in the digital trust infrastructure. The model trust card sets forth model specific information of the machine learning models that are verified and evaluated.

The method of the present invention also includes selecting with a cohort selection unit of the cohort determination unit the plurality of cohorts from the set of cohorts based on the cohort attributes, wherein the cohort attributes are selected from a total set of cohort attributes, and selecting with the cohort selection unit the plurality of cohorts based on a predefined set of cohort attributes.

The method can also include applying an analytical technique to input data for extracting the cohort attributes from the input data to form the total set of cohort attributes, ranking the total set of cohort attributes based on selection criteria, wherein the attribute ranking unit generates ranked cohort attribute data, determining the plurality of cohort attributes from the total set of cohort attributes based on the ranked cohort attribute data, and selecting the plurality of cohorts from the total set of cohorts based on the plurality of cohort attributes.

Further, the method can include applying, with a statistical measurement unit of the objective assessment unit, (a) one or more statistical measuring techniques to one or more of the output cohort data and the cohort verification data to generate the assessment score, or (b) a blind-index technique to one or more of the output cohort data and the cohort verification data to determine the assessment score, wherein the blind-index technique employs a blind dataset to evaluate the machine learning model, or (c) an inter-rater reliability (IRR) technique to the output cohort data and the cohort verification data to assess a level of agreement among the plurality of cohorts. The method of the present invention can also, with the model evaluation unit, be configured for evaluating the machine learning model based on the model evaluation data, wherein the model evaluation data includes one or more of evaluation ground truth data, test harness data, benchmark data, and threshold setting data, wherein the evaluation ground truth data comprises labeled data that is free from errors, comparing predictions generated by the machine learning model with the evaluation ground truth data to identify incorrect model predictions, and analyzing incorrect model predictions generated by the machine learning model to determine if the machine learning model is generating erroneous predictions. Still further, the method can be configured for evaluating the machine learning model by testing a performance of the machine learning model based on the test harness data, and assessing an effectiveness of the machine learning model by comparing the model with one or more other machine learning models based on benchmark data. Yet further, the method can be configured for applying one or more enterprise parameters, and one or more of the evaluation ground truth data, the scenario-based test harness data, the benchmark data, and the threshold setting data, to the assessment score generated by the objective assessment unit to evaluate the performance of the machine learning model. Optionally, the method can include one or more of independently evaluating the performance of the machine learning model based on the output model evaluation data using a separate dataset to ensure reliable results of the machine learning model, assessing the performance of the machine learning model under one or more predefined scenarios that simulate real time scenarios, assessing the output model evaluation data by one or more peers with selected expertise to identify bias or error in an output of the machine learning model, assessing the performance of the machine learning model by comparing the output of the machine learning model to outputs of one or more other machine learning models, and evaluating the machine learning model to resolve inconsistencies in ratings of the machine learning model by different cohorts using an inter-rater technique.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

FIG. 3 is an example of a model trust card that can be employed to set forth selected information associated with trusted models verified and evaluated by the system of FIG. 1 according to the teachings of the present invention.

DETAILED DESCRIPTION OF THE INVENTION

Figure 1:
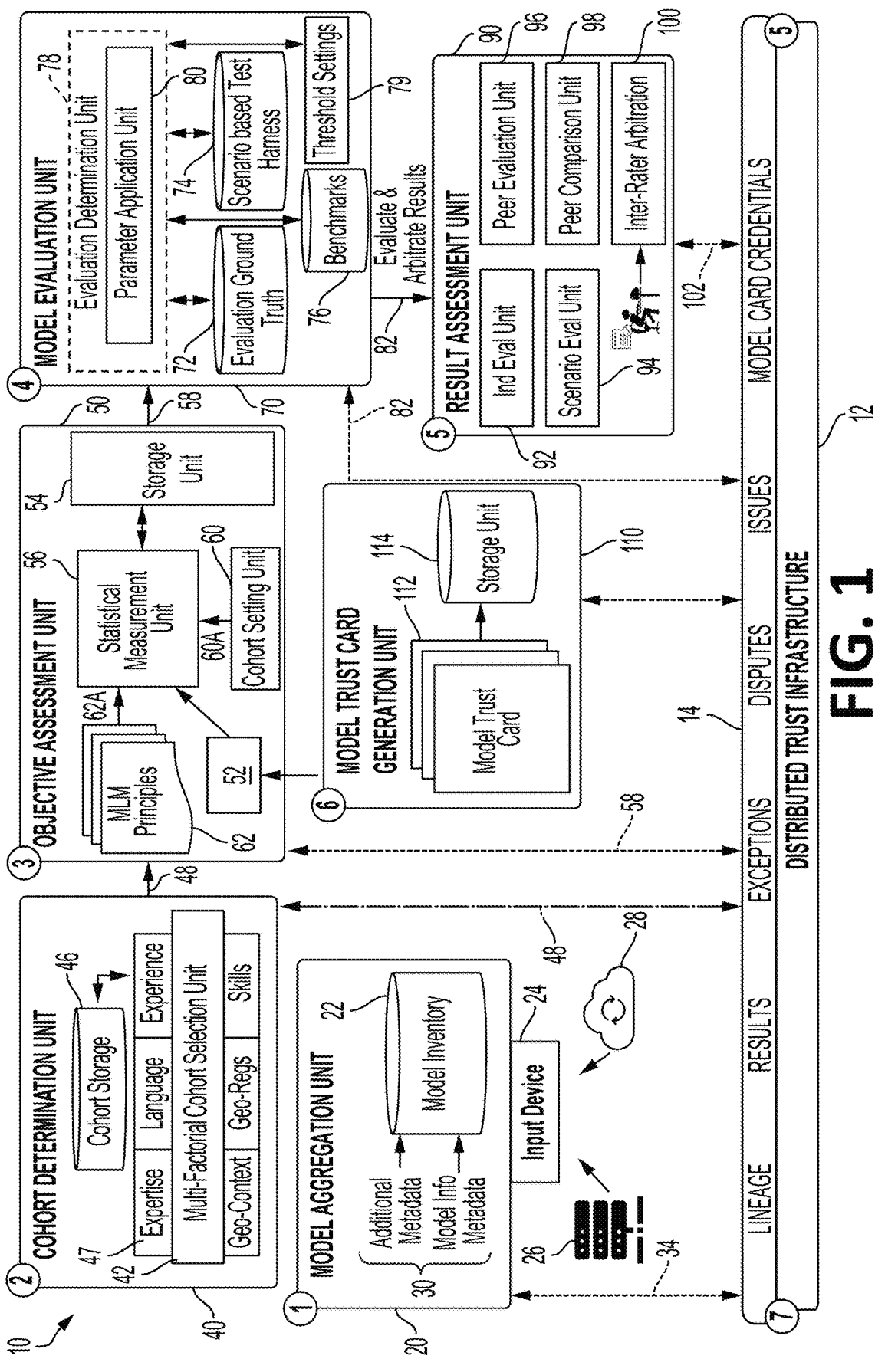
FIG. 1 is a schematic block diagram of the model verification system according to the teachings of the present invention.

The present invention relates to the technological field of artificial intelligence (AI) and machine learning (ML) systems, and more particularly to systems and methods for the verification and evaluation of machine learning models, including generative language models and associated generative artificial intelligence systems. The models and systems are increasingly deployed in enterprise and mission-critical applications where responsible operation, accuracy, compliance, and trustworthiness are required. Ensuring the reliability of the models and systems under diverse conditions presents significant technical challenges, especially in domains governed by legal, regulatory, or safety constraints.

Conventional model verification techniques often rely on centralized, opaque, and biased evaluation processes. These conventional approaches lack the ability to adapt to complex real-world conditions, such as geographic variation, contextual relevance, and jurisdiction-specific requirements. Moreover, conventional systems frequently involve verification performed or overseen by the same entities responsible for developing the models, introducing conflicts of interest and limiting transparency.

The present invention provides a technological improvement to the field of AI model and system verification through a system and method that implements a blinded, multi-party verification process for evaluating the performance and behavior of machine learning models. In particular, the system of the present invention enables dynamic, continuous, and reproducible verification using independently selected raters or cohorts who are blinded from each other and from the parties being evaluated. Verification participants may be selected based on a range of multi-factorial attributes, including domain expertise, geographic location, primary language, contextual knowledge, industry background, and regulatory familiarity. This flexible architecture allows for objective, domain- and context-specific evaluation of generative models under diverse operational scenarios.

The blinded, multi-party design helps prevent collusion, bias, and undue influence, improving trust in the verification and subsequent evaluation outcomes and addressing shortcomings of traditional model verification and assessment systems. The system of the present invention further provides for transparency in how verification is conducted, offering traceable, auditable mechanisms for model verification in environments where trust and compliance are essential. By enabling reproducible, unbiased evaluations of machine learning models in real-world contexts, the present invention enhances the functionality, reliability, and accountability of AI systems, and provides a concrete and practical application of machine learning technology. Accordingly, the present invention advances the underlying technology by solving specific technical problems in model verification and supports trustworthy deployment in safety-sensitive domains.

The present invention thus relates to the field of model and system verification and evaluation, addressing common issues such as the complexity of conventional verification processes, which involve diverse factors such as geolocation and context, and the need to adhere to local regulations. As noted herein, traditional approaches often fail to account for the complexity of real-world artificial intelligence or machine learning systems that operate under diverse and changing conditions. Without sufficient transparency into verification and evaluation methodologies and participants, conventional systems have difficulty assessing verification results, compromising trust in model selection and performance. Additional concerns include potential conflicts of interest, as parties responsible for model development oftentimes oversee verification of the model, further jeopardizing trust in the model results.

The present invention provides improvements to this field of technology by offering a system and model verification system and associated method that employs a blinded multi-party verification technique to verify generative language models and generative artificial intelligence systems. The generative language models require verification to ensure that the models operate responsibly and achieve intended outcomes. The approach of the present invention can include a dynamic, multi-stakeholder blinded verification process for the continuous verification and evaluation of machine learning models, such as generative language models, and the systems that use them. The goal of the present invention is to promote unbiased, reproducible assessments by preventing potential biases between evaluators and the subjects of evaluation. The method also accommodates testing of the machine learning systems and models under diverse operating conditions to establish trust in the underlying systems that employ the models.

The verification system and method of the present can include selecting verification participants (e.g., independent reviewers or evaluators) and usage participants based on multi-factorial attributes, including industry domain, skills, locale, expertise, primary language, years of experience, and the like. The present invention also considers the context, geolocation, circumstances, geo-specific regulations, and the environment in which the models run. The blinded review process hides reviewer or evaluator identities and details from participants so as to promote an independent and unbiased review of the models. By employing multiple blinded parties during the verification process, the present invention improves upon conventional model validation and verification processes by preventing bias and influence from any one source, thereby enhancing trust in the field of technology.

As used herein, the term "enterprise" is intended to include all or a portion of a company, a structure or a collection of structures, facility, business, company, firm, venture, joint venture, partnership, operation, organization, concern, establishment, consortium, cooperative, franchise, or group or any size. Further, the term is intended to include an individual or group of individuals, or a device or equipment of any type.

As used herein, the term "source data" can include any type of data from any suitable source that would benefit from being converted into a more usable form or should be acted upon by the system of the present invention. The source data can include, for example, financial related data and non-financial related data. The source data can be in hard copy or written form, such as in printed documents, or can be in digital file formats, such as in portable document format (PDFs), word processing file formats such as WORD documents, as well as other file formats including hypertext markup language (HTML) file formats and the like. It is well known in the art that the hard copies can be digitized, and the relevant data extracted therefrom.

As used herein, the term "enrich," "enriched" or "enriching" is intended to include the ability to ingest, integrate, augment, improve and/or enhance data by supplementing missing or incomplete data, correcting inaccurate data, adding additional data, or processing the data using known techniques, such as with artificial intelligence, machine learning and risk modelling techniques, and then applying logic and structure to the data so as to curate, correct and/or clean the data. The term enrich can also include the ability to correlate factors to the data so as to generate or create meaningful insights and conclusions based on the data, including environmental and financial data. In the context of prompts, the prompts can be enriched by adding more context, detail, or specificity in order to better guide or instruct a machine learning model a conversation or direct the output of the model towards a desired outcome. This can involve providing additional information, constraints, examples, or specifications that help the model generate a more relevant and tailored response.

As used herein, the term "machine learning" or "machine learning model" or "model", whether in singular or plural form, is intended to mean or refer to the application of one or more software application based techniques that process and analyze data to identify patterns and to generate inferences, predictions, classifications, decisions, and/or recommendations based on the patterns in the data. The machine learning techniques may include a variety of models and algorithms, such as supervised learning, unsupervised learning, reinforcement learning, semi-supervised learning, deep learning, and natural language processing (NLP) techniques, including natural language generation (NLG) and generative language models. The machine learning models are typically trained using training data. The training data is used to optimize the parameters of the model, such as the weights in a neural network. As such, the better the training data, the more accurate and effective the machine learning model can be. In the case of supervised learning, the training data includes labeled examples (i.e., input-output pairs) that allow the model to learn a mapping from inputs to target outputs. Common tasks performed by supervised learning models include classification and regression. Unsupervised learning models are trained on unlabeled data and are configured to identify hidden patterns, structures, or groupings in the data. Common unsupervised learning tasks include clustering and dimensionality reduction. Semi-supervised learning techniques combine elements of supervised and unsupervised learning by utilizing a small amount of labeled data in conjunction with a larger volume of unlabeled data to improve model performance. The semi-supervised learning models combine elements of both supervised and unsupervised learning models, utilizing limited labeled data alongside larger amounts of unlabeled data to improve model performance. Reinforcement learning involves training an agent to take sequential actions within an environment to maximize a reward signal. The agent learns through trial and error by receiving feedback in the form of rewards or penalties based on its actions. Deep learning is a subfield of machine learning that utilizes neural networks with multiple layers to automatically learn hierarchical feature representations from data. A neural network includes a plurality of interconnected nodes (or "neurons") organized into layers, where each connection is associated with a weight that determines the strength of the signal passed between neurons. The weights are updated during training to minimize prediction error and improve performance. By adjusting these weights based on input data and desired outcomes, neural networks can learn complex patterns and relationships within the data. Examples of neural networks used in deep learning include feedforward neural networks (FNNs), convolutional neural networks (CNNs), recurrent neural networks (RNNs), long short-term memory (LSTM) networks, gated recurrent units (GRUs), autoencoders, generative adversarial networks (GANs), and transformer-based architectures. Transformer-based models, including large language models (LLMs), are configured to process and generate human language by learning contextual relationships between tokens in a sequence. These models are typically pre-trained on large corpora of text using self-supervised learning techniques and can perform a wide range of language-related tasks, such as text generation, translation, summarization, question answering, and sentiment analysis. The large language models (LLMs) may include, or be implemented as, generative artificial intelligence (AI) models that are capable of generating coherent and contextually appropriate text responses based on input prompts. LLMs can be configured to understand and generate human language by learning patterns and relationships from large datasets. These models may utilize deep learning techniques, particularly transformer architectures, to process and generate text. LLMs can be pre-trained on massive corpora of textual data using self-supervised learning techniques and may perform tasks such as text generation, language translation, summarization, sentiment analysis, question answering, and other natural language processing tasks.

A transfer learning model can involve training a model on a first task and subsequently applying the learned parameters or representations to a second, related task, thereby enhancing training efficiency and model performance. An ensemble learning model can combine the outputs of multiple individual models to improve overall predictive accuracy. Common ensemble techniques include bagging, boosting, and stacking. An online learning model can be incrementally updated as new data becomes available, making such models suitable for real-time or dynamic environments. An instance-based learning model can generate predictions based on similarity measures between new input instances and previously observed training instances.

The machine-learning processes described herein may be utilized to generate machine-learning models. As used herein, a machine-learning model refers to a mathematical representation of a relationship between one or more inputs and corresponding outputs, generated using any machine-learning technique, including without limitation any of the processes described above, and stored in memory. Once created, a machine-learning model may receive one or more input values and produce a corresponding output based on the learned relationship derived during training. For example, and without limitation, a linear regression model generated using a linear regression algorithm may compute a linear combination of input features using coefficients learned during training to generate an output value. As a further non-limiting example, a machine-learning model may be implemented as an artificial neural network, such as a convolutional neural network (CNN), comprising an input layer of nodes, one or more hidden (intermediate) layers, and an output layer of nodes. Connections between nodes may be established and weighted through a training process in which data from a training dataset are applied to the input layer. A training algorithm—such as Levenberg-Marquardt, conjugate gradient, simulated annealing, or other optimization algorithms—may be used to iteratively adjust the connection weights between nodes in adjacent layers to minimize prediction error and produce desired outputs at the output layer. This type of approach may be referred to as deep learning.

As used herein, the term "generative model," "generative AI model" or "generative language model", whether in singular or plural form, is intended to mean or refer to a category of machine learning models configured to generate new outputs based on data on which the models have been trained. Generative models may produce new content in various modalities, including text, images, audio, code, simulations, and the like. Generative language models specifically focus on generating natural language text and are typically based on deep learning neural networks, such as large language models (LLMs) employing transformer architectures. These models learn patterns and relationships within training data and generate new language content based on the learned representations. Generative models may include, without limitation, generative adversarial networks (GANs), which consist of two neural networks trained adversarially to generate realistic images, audio, or other data types; variational autoencoders (VAEs), which learn latent representations of data for generation tasks; and deep convolutional GANs (DCGANs), which use convolutional layers for generating realistic images and textures. For language generation tasks, recurrent neural networks (RNNs), including variants such as long short-term memory (LSTM) networks and gated recurrent units (GRUs), have historically been employed to generate sequential data by predicting the likelihood of each word based on preceding context. More recently, transformer-based architectures have become prevalent for natural language processing and generation, as they can effectively attend to various parts of input sequences and learn complex dependencies to produce coherent and contextually relevant text. The generative AI models described herein can be trained on diverse types of training data, including text, images, and audio, and can be applied to a variety of applications such as image and video synthesis, natural language generation, music composition, code generation, and other content creation tasks.

In the present disclosure, data used to train a machine learning model can include data containing correlations that a machine learning process or technique may utilize to model relationships between two or more types or categories of data elements ("training data"). For example, and without limitation, the training data may comprise a plurality of data entries, each entry representing a set of data elements that were recorded, received, and/or generated together. The data elements may be correlated by shared co-occurrence within a data entry, proximity within the data, or other relationships. Multiple data entries within the training data may exhibit one or more trends or patterns in correlations between categories or types of data elements. For instance, and without limitation, a higher value of a first data element belonging to a first category or type of data element may tend to correlate with a higher value of a second data element belonging to a second category or type of data element, indicating a possible proportional or other mathematical relationship linking values across categories. Multiple categories of data elements may be related in the training data according to various correlations, which may indicate causative, associative, and/or predictive links between categories of data elements. These correlations may be modeled as mathematical or statistical relationships by the machine learning processes described herein. The training data may be formatted and/or organized by categories of data elements, for example by associating data elements with one or more descriptors corresponding to categories. As a non-limiting example, training data may include data entered in standardized forms by persons or processes, such that entry of a given data element in a given field within a form may be mapped or correlated to one or more category descriptors. Elements in the training data may be linked to descriptors of categories or types by tags, tokens, or other data elements. For example, and without limitation, training data may be provided in fixed-length formats, formats linking positions of data to categories such as comma-separated value (CSV) formats, and/or self-describing formats such as extensible markup language (XML), enabling processes or devices to detect categories of data.

Alternatively, or additionally, the training data may include one or more data elements that are not categorized, that is, the training data may not be formatted or contain descriptors for some elements of data. Machine-learning models or algorithms and/or other processes may sort the training data according to one or more categorizations using, for instance, natural language processing algorithms, tokenization, detection of correlated values in raw data and the like. The categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name or other types of data may be identified by reference to a list, dictionary, or other compendium of terms, permitting ad-hoc categorization by machine-learning algorithms, and/or automated association of data in the data entry with descriptors or into a given format. The ability to categorize data entries automatically may enable the same training data to be made applicable for two or more distinct machine-learning algorithms as described in further detail below. Training data used by an electronic device may correlate any input data as described in this disclosure to any output data as described in this disclosure.

As used herein, the term "data object" can refer to a location or region of storage that contains a collection of attributes or groups of values that function as an aspect, characteristic, quality, entity, or descriptor of the data object. As such, a data object can be a collection of one or more data points that create meaning as a whole. One example of a data object is a data table, but a data object can also be data arrays, pointers, records, files, sets, and scalar type of data.

As used herein, the term "attribute" or "data attribute" is generally intended to mean or refer to the characteristic, properties or data that describes as aspect of a data object or other data. The attribute can hence refer to a quality or characteristic that defines a person, group, or data objects. The properties can define the type of data entity. The attributes can include a naming attribute, a descriptive attribute, and/or a referential attribute. The naming attribute can name an instance of a data object. The descriptive attribute can be used to describe the characteristics or features or the relationship with the data object. The referential attribute can be used to formalize binary and associative relationships and in referring to another instance of the attribute or data object stored at another location (e.g., in another table). When used in connection with prompts for use with a generative language model, the term is further defined below.

The term "application" or "software application" or "program" as used herein is intended to include or designate any type of procedural software application and associated software code which can be called or can call other such procedural calls or that can communicate with a user interface or access a data store. The software application can also include called functions, procedures, and/or methods.

The term "graphical user interface" or "user interface" as used herein refers to any software application or program, which is used to present data to an operator or end user via any selected hardware device, including a display screen, or which is used to acquire data from an operator or end user for display on the display screen. The interface can be a series or system of interactive visual components that can be executed by suitable software. The user interface can hence include screens, windows, frames, panes, forms, reports, pages, buttons, icons, objects, menus, tab elements, and other types of graphical elements that convey or display information, execute commands, and represent actions that can be taken by the user. The objects can remain static or can change or vary when the user interacts with them.

As used herein, the term "electronic device" can include servers, controllers, processors, computers, tablets, storage devices, databases, memory elements and the like.

The model verification system of the present invention is shown for example in FIG. 1 The illustrated model verification system 10 includes a distributed trust infrastructure 12 that can include a distributed ledger-like blockchain. The digital trust infrastructure 12 can secure in a trusted and verifiable manner data that is received from one or more system components, such as for example from the model inventory, evaluator data, objective configurator, model evaluator, assessment results, model system cards, and the like. The data once secured in the distributed trust infrastructure 12 is resistant to change and is easily verifiable. The data secured in the digital trust infrastructure 12 can be open for inspection or access to the data and can be restricted in known ways. The distributed trust infrastructure 12 can employ a blockchain, thus enabling the model verification system to cryptographically verify and store the logic and structure applied to the stored data so as to curate the data. The stored and verifiable data can also be used for subsequent reporting and analysis.

In a blockchain, as is known, the original data or the processed data can be stored in a series of batches or blocks that include, among other things, a time stamp, a hash value of the data stored in the block, a copy of the hash value from the previous block, as well as other types of information, including for example the origins of the data. The blockchain is shared with a plurality of nodes in a blockchain network in a decentralized manner with no intermediaries. Since many copies of the blockchain exist across the blockchain network, the veracity of the data in the blocks can be easily tracked and verified. Each instance of new data from the source data or data and models and techniques employed by the system can be stored in a block on the blockchain. The blockchain thus functions as a decentralized or distributed ledger having data associated with each block that can be subsequently reviewed and/or processed. The data in the blockchain can be tracked, traced, and presented chronologically in a cryptographically verified ledger format of the blockchain to each participant of the blockchain. As such, the blockchain can provide an audit trail corresponding to all of the data in the blocks, and thus can determine who interacted with the data and when, as well as the sources of the data and any actions taken in response to the data. According to one embodiment, each node of the blockchain network can include one or more computer servers which provides processing capability and memory storage. Any changes made by any of the nodes to a corresponding block in the blockchain are automatically reflected in every other ledger in the blockchain. As such, with the distributed ledger format in the blockchain, provenance can be provided with the dissemination of identical copies of the ledger, which has cryptographic proof of its validity, to each of the nodes in the network. Consequently, all of the various types of data (e.g., original data, enriched data, the software and models and techniques employed to enrich the data, and the insights and recommendations generated therefrom) can be stored in the blockchain, and the blockchain can be used to verify, prove and create an immutable record of the data, various rule based models and techniques, and machine learning models and techniques, as well as to track users accessing the data and any associated insights generated by the models.

The blockchain can employ a smart contract 14. As used herein, the term "smart contract" is intended to mean or refer to executable computer code, logic, or protocols that are stored on the blockchain and enable the system 10 to generate data for storage in the blockchain according to a predefined set of rules or upon the occurrence of predefined conditions. Accordingly, a smart contract can process incoming data that satisfies the predefined rules and generate new information or facts that are appended to the ledger of the blockchain. The smart contract thus enables enterprises to transact business with each other according to a common set of defined terms, data, rules, concept definitions, and processes. Collectively, the smart contracts define the business model and govern all interactions within or between enterprises or parties in executable code. Applications invoke a smart contract to generate transactions that are recorded on the ledger. Specifically, the smart contract implements governance rules for any type of business object, allowing such rules to be automatically enforced upon execution of the smart contract. For example, a smart contract can ensure that a new car delivery is made within a specified timeframe or that funds are released according to prearranged terms, thereby improving the flow of goods or capital, respectively. Notably, execution of a smart contract is typically more efficient than manual human business processes. Smart contracts can be grouped together to form a chaincode, which is used by administrators to package related smart contracts for deployment. Generally, a smart contract defines the transaction logic controlling the lifecycle of a business object contained in the blockchain's world state. Chaincode governs how one or more smart contracts are packaged and deployed to the blockchain. When chaincode is deployed, all smart contracts within it become available to applications. An example of a system suitable for generating or employing a smart contract in connection with documents is disclosed in U.S. Pat. No. 10,528,890, assigned to the assignee hereof, the contents of which are herein incorporated by reference.

At a basic level, the blockchain immutably records transactions which update states in a ledger. The smart contract can programmatically access two distinct pieces of the blockchain ledger, namely, a blockchain, which immutably records the history of all transactions, and a world state that holds a cache of the current value of these states. The blockchain is an immutable ledger of all transactions that have occurred, where every transaction is reflected as an object recorded to the blockchain in a discrete block. Each block of the chain contains an object key. Multiple transactions with the same object key can occur. The world state is in essence a database that sits on the blockchain and holds current values for a given object key. The world state changes over time as new transactions reference the same object key. As a result, the blockchain determines the world state, and the ledger is comprised of both the blockchain and the world state. The smart contracts primarily put, get and delete states in the world state, and can also query the immutable blockchain record of transactions. The "get" typically represents a query to retrieve information about the current state of a business object. The "put" typically creates a new business object or modifies an existing one in the ledger world state, and the "delete" typically represents the removal of a business object from the current state of the ledger, but not the history of the ledger.

Further, when the smart contract executes, the contract runs on a peer node that forms part of the blockchain network. The smart contract takes a set of input parameters called the transaction proposal and uses them in combination with program logic to read from and write to the ledger. Changes to the world state are captured as a transaction proposal response, which contains a read-write set with both the states that have been read, and the new states that are to be written if the transaction is valid. The world state is not updated when the smart contract is executed.

A generative artificial intelligence (AI) system refers generally to a computing system configured to generate content based on learned patterns in data. In particular, such systems can include one or more generative models, including but not limited to generative language models, that are trained on large corpora of structured or unstructured data to produce novel output content in response to user input or predefined prompts. In various embodiments, a generative AI system includes a machine learning model trained to predict and generate sequences, such as natural language text, by estimating the conditional probability of the next token (e.g., word, sub-word unit, or character) given a preceding sequence of tokens. The generative language model may be implemented using a neural network architecture, such as a transformer-based architecture, and may be trained using supervised learning, unsupervised learning, reinforcement learning, or combinations thereof. Upon receiving an input prompt, the system processes the input through the trained model to generate output content that is contextually relevant and coherent with the input. Output content may include, for example, natural language text, computer code, images, audio, or other forms of synthetic media. The generated output can be used in a variety of applications, including content generation, summarization, code completion, dialog systems, creative writing, automated report generation, and more. In some embodiments, the generative AI system further includes pre-processing and post-processing modules to refine the input and/or output, as well as filtering mechanisms or control modules to ensure the safety, relevance, or domain-specific suitability of the generated content. The generative AI system may be implemented on a single computing device or distributed across a network of servers, and may support user interaction through an application programming interface (API), graphical user interface (GUI), or other input/output interface. According to one embodiment, the verification system 10 of the present invention can be a generative artificial intelligence system.

The illustrated system or model verification system 10 can include a model aggregation unit 20 for aggregating together the machine learning models associated with the enterprise or to be imported into the enterprise. The model aggregation unit 20 can employ suitable software applications for retrieving the machine learning models and for storing the machine learning models in a suitable storage element 22, such as a database. The database thus serves as an inventory for the machine learning models associated with the enterprise. The model aggregation unit 16 can also include an input device 24 for importing or uploading the machine learning models into the database. The input device 24 can be coupled to one or more electronic devices 26 that has the machine learning model stored therein for importing the machine learning models into the model aggregation unit 16. Similarly, the input device 24 can be coupled to one or more electronic networks 28 that are suitable for importing the machine learning models into the model aggregation unit 20 therefrom.

The machine learning models stored in the storage unit 22 can also include metadata 30. As used herein, the term "metadata" is intended to mean data that describes data. Specifically, metadata can refer to information that describes and provides context to a data object, such as a machine learning model. The information can include but is not limited to details about the structure, components, and parameters of the machine learning model, the data and processes used to train the model, reproduce the model, manage the model, performance metrics, versioning information, deployment configurations, verification related information, and the like. The metadata facilitates understanding, utilization, and management of the machine learning model by providing contextual information that supports development, deployment, and maintenance of the model. In certain implementations, metadata associated with a machine learning model can include various types of information relevant to the structure, training, evaluation, deployment, and versioning of the model. For example, model architecture metadata may include the type of model and hyperparameter-related information such as learning rate, batch size, number of training epochs, and similar configuration details. Training-related metadata may include a description of the dataset used for training, data preprocessing steps such as normalization and augmentation, and information regarding how the dataset was partitioned into training, validation, and test subsets. Metadata relating to the training process may include the duration of training, computational resources utilized, training loss and model accuracy over time, and the optimization algorithm employed, such as Adam or stochastic gradient descent (SGD). Evaluation-related metadata may include performance metrics such as accuracy, precision, recall, and F1 score, as well as confusion matrices, evaluation plots, and results from cross-validation procedures. Versioning metadata may include a model version number or identifier, the version numbers of machine learning libraries and frameworks used (e.g., TensorFlow, PyTorch), and version information associated with source code repositories, such as a Git commit hash. Deployment metadata may include details of the deployment environment (e.g., production or staging), information relating to model endpoints or application programming interfaces (APIs), and any post-processing steps applied to outputs during inference. Additional metadata may include provenance and lineage information, such as the name of the model's author or creator, the date of creation and last modification, and the origin of the model, for example, whether it was pre-trained or transferred from another task. Metadata may also include configuration-related information, such as configuration files specifying the model setup, training scripts, and associated parameters. Such metadata may be used, for example, to track, audit, reproduce, or manage machine learning models within a system or across different environments.

The model aggregation unit 20 can also add any of the foregoing types of metadata or other types of metadata to the models, or associated with the models, stored in the storage unit 22. The model information 34 stored in the storage unit 22 can be conveyed to and stored in the distributed trust infrastructure 12. The metadata about the systems and models, including knowledge assistants, agents, and generative language models, can be stored in a machine learning model inventory and can play a role in the model verification lifecycle. For example, the machine learning model inventory can store detailed metadata about the model's training data, architecture, hyperparameters, or the entire training process, allowing auditors and verifiers to understand the model's origins, assumptions, and potential biases. This provides for model traceability and provenance. The metadata can also include information about the model architecture, training data, hyperparameters, random seeds, and the complete training pipeline environment enables faithful reproduction of the model for independent verification and validation, thus ensuring reproducibility of model behavior and performance. The metadata can also include historical model data to monitor the performance of the model and detect any drift or degradation of the model, thus triggering the need for re-verification or model updates. The metadata can also include data about the model's compliance with regulations, standards, and ethical guidelines, thus ensuring that the model meets necessary requirements for deployment in specific domains or jurisdictions. The metadata can also include data about potential risks, failure modes, and mitigation strategies that inform and triggers rigorous testing or additional safeguards. The metadata can further include data about development, deployment, and verification processes to ensure the appropriate stakeholder involvement, promoting transparency and accountability. The machine learning model inventory can serve as a central repository for storing and tracking ongoing verification processes, such as audits, stress tests, or real-world performance monitoring, continuously assessing trustworthiness and identifying areas for improvement.

The model verification system 10 of the present invention can also include a cohort determination unit 40 for allowing the system to automatically determine and select multiple cohorts to verify one or more of the machine learning models aggregated by the model aggregation unit 20. As used herein, the term "cohort", whether in singular or plural form, is intended to mean or refers to a reviewer, multiple reviewers or evaluators, or a subset of data selected from a larger dataset, wherein the reviewers or the data entries can be defined by one or more shared attributes, features or characteristics. Such cohorts can be used to systematically verify and evaluate the performance, fairness, and robustness of a machine learning model across distinct segments of data. The purpose of determining and selecting cohorts is to verify the performance and behavior of the machine learning model across different segments of the population, ensuring that the model is robust, fair, and generalizes well to various subgroups. The purpose of cohort selection includes ensuring that the model performs well not only on training data but also on new data and mitigates any potential biases that may be present in the machine learning model. By verifying model performance by different blinded cohorts, it is possible to detect if the model is unfairly biased towards or against particular groups. Further, the selection of multiple different cohorts can help assess the robustness of the machine learning model under different conditions. Cohort selection allows for testing the model's stability and reliability as part of the verification process when the model is subjected to data from various segments of the population. Further, the multiple different cohorts can help identify any errors in the model or identify where the model may be underperforming. This can highlight specific areas where the model needs improvement. The cohorts can have one or more attributes in common.

The illustrated cohort determination unit 40 can include a multi-factorial cohort selection unit 42 and a cohort storage unit 46. The cohort storage unit 46 can store a total set of cohorts from which the cohort selection unit 42 can select a subset of cohorts to review and verify the machine learning model or system. The cohort storage unit 46 can also optionally store the subset of cohorts selected from the total set of cohorts by the cohort selection unit 42. The cohort storage unit 46 can further optionally store a total set of cohort attributes that can be employed by the cohort selection unit 42 when determining the subset of cohorts. The illustrated cohort selection unit 42 can select the subset of cohorts from the total set of cohorts based on multiple different cohort attributes from the total set of cohort attributes. As used herein, the term "cohort attribute(s)" is intended to refer to specific characteristics, features, or properties associated with a cohort or that define and distinguish a particular group of data samples used during the verification process of the machine learning model or system. The attributes can encompass the relevant aspects of data, such as demographic information, behavioral patterns, environmental conditions, or any other pertinent variables that are employed when evaluating the performance, accuracy, and robustness of the machine learning model across diverse subsets of the overall dataset. Cohort attributes help ensure that the verification process is comprehensive and that the model performs consistently and equitably across different segments of the data population. The cohorts can share common cohort attributes, such as demographic attributes or characteristics (e.g., age, gender, ethnicity, income level, education, language, skills, experience, or occupation), geographic attributes, health or clinical status attributes (e.g., medical conditions or treatment types), behavioral pattern attribute, skills based attributes, health or clinical status attributes, temporal characteristic attribute (e.g., groups of people defined by specific time periods or events), or any other relevant factors that are pertinent to the problem being addressed by the machine learning model. In certain implementations, verification across multiple cohorts may also facilitate the detection of model errors or underperformance in specific conditions or domains, enabling targeted improvements. Cohort selection further enables the assessment of model robustness, reliability, and stability when subjected to diverse data types or subgroups According to one optional embodiment, the cohort selection unit 42 can determine the subset of cohort attributes from the total set of cohort attributes that can be used to select the subset of cohorts based on one or more of the machine learning model and/or the cohort attributes provided in selected input data. The selected input data can include, for example, multi-factorial attribute data, contextual attribute data, blind review attribute data, and party or cohort related attribute data. The multi-factorial cohort attribute data can include domain-specific information, including for example information related to industry verticals such as healthcare, finance, technology, and/or education. Additionally, the cohort attribute data may include skill-related information, such as competencies in natural language processing, data analysis, programming, and other domain-specific proficiencies. Locale information, including geographic region (e.g., country, state, urban or rural classification), may also be included. Other data elements may relate to expertise, including years of experience, professional certifications, and publications. Language proficiency and educational background may also be included within this attribute class. The contextual attribute data may include application context data (e.g., enterprise, consumer, or research use cases), geolocation data (e.g., GPS coordinates, city, state/province, or country), circumstantial data (e.g., time of day, day of the week, or environmental conditions such as weather), and jurisdiction-specific regulatory compliance data (e.g., compliance with GDPR, CCPA, or industry-specific regulations). In certain embodiments, contextual data may further include operational environment data (e.g., whether the system is operating on mobile, desktop, cloud, or on-premises infrastructure), environmental conditions (e.g., noise levels, lighting, temperature), and scenario-specific use case data for which the machine learning model is intended to be deployed. The blinded review cohort attribute data can also include evaluator identity data (e.g., name, affiliation, or contact information), demographic data (e.g., age, gender, ethnicity), evaluator background data (e.g., education, work experience, and certifications), system or model-related data (e.g., architecture, training data sources, and performance metrics), conflict of interest data (e.g., financial, personal, or organizational relationships), and technology proficiency data (e.g., level of familiarity with relevant machine learning systems). The multiple blinded cohort attribute data may further include evaluator population constraints (e.g., minimum and maximum number of evaluators), evaluator selection criteria (e.g., experience level thresholds, language proficiency requirements), evaluator diversity metrics (e.g., measures such as Simpson's Index or Shannon Entropy), evaluator assignment methodologies (e.g., random or stratified allocation), evaluator incentive data (e.g., compensation or recognition-based incentives), evaluator training protocols (e.g., onboarding and standardization procedures), evaluation round information (e.g., number of rounds and advancement criteria), and evaluation methodology (e.g., defined tasks, test cases, or use scenarios).

Figure 2:
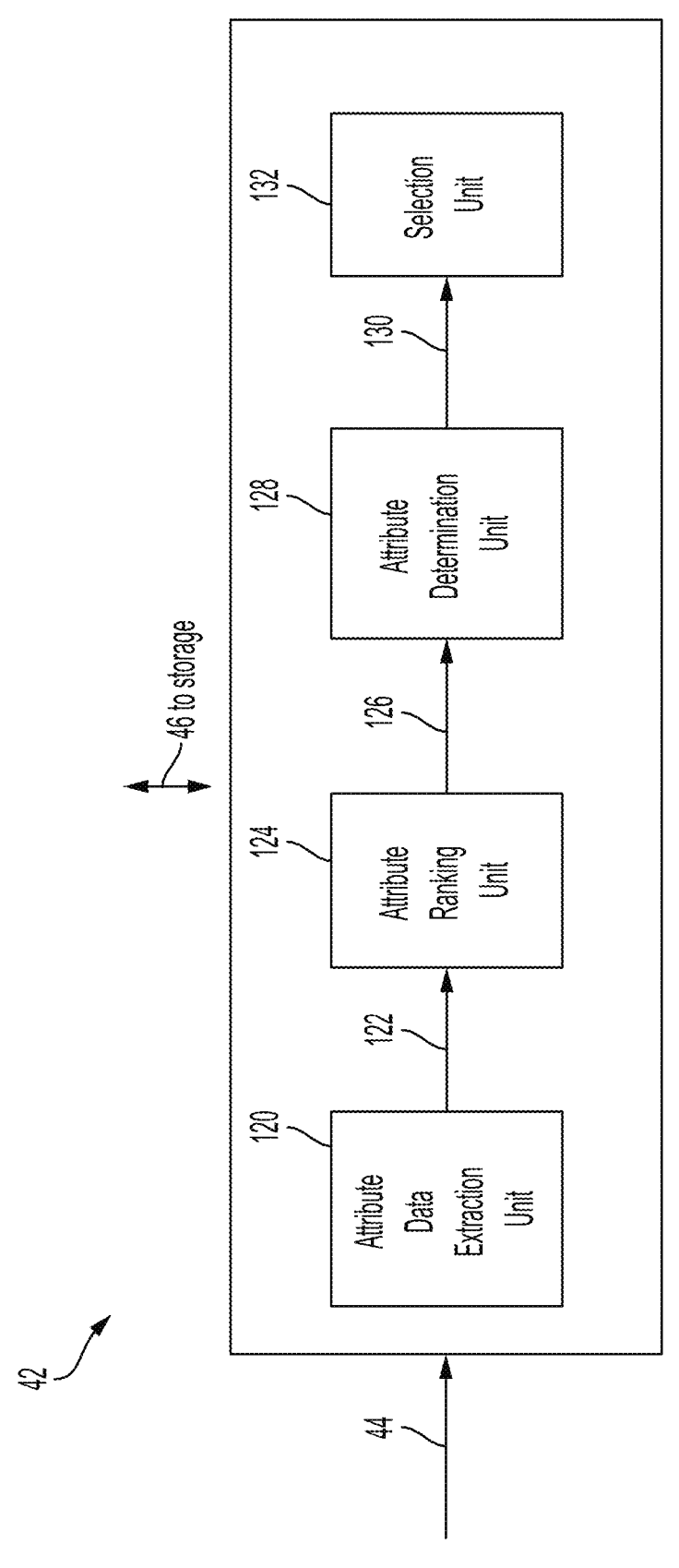
FIG. 2 is a schematic block diagram of the multi-factorial cohort selection unit of the cohort determination unit of FIG. 1 according to the teachings of the present invention.

For example, as shown in FIGS. 1 and 2, the cohort selection unit 42 can include an attribute data extraction unit 120 for automatically extracting the attribute information from input data 44 that is associated with potentially relevant cohort attributes. The cohort attribute data associated with the input data 44 can include demographic information (e.g., age, gender, or location), behavioral information (e.g., usage patterns or purchase history), or other domain-specific information. The attribute data extraction unit 120 can be configured to apply one or more analytical techniques to the input data 44 to identify and extract relevant cohort attribute data needed for accurate cohort selection. The analytical techniques can include one or more statistical analysis techniques, a clustering technique, and other machine learning based techniques. The attribute data extraction unit 120 can then generate output attribute data 122 that includes a plurality of cohort attributes suitable for use in automated cohort selection.

The cohort selection unit 42 can also include an optional attribute ranking unit 124 for receiving the output attribute data 122 and for ranking the cohort attributes within the output attribute data 122. According to one embodiment, the attribute ranking unit 124 can perform a ranking process by applying one or more types of selection criteria, such as statistical significance, relevance to the model's performance, or regulatory requirements, to the cohort attribute data 122 so as to rank the cohort attributes for subsequent use during cohort selection. Once the attributes are ranked, the attribute ranking unit 124 generates attribute ranking data 126. The attribute ranking data 126 is subsequently received by the attribute determination unit 128, which selects or determines the subset of cohort attributes from the total set of cohort attributes that can be stored in the cohort storage unit 46. The attribute determination unit 128 then generates ranked cohort attribute data 130, which indicates the specific set of cohort attributes that will be used by the cohort determination unit 40 to identify and select the appropriate cohorts. Thus, the attribute ranking and determination process ensures that the most relevant and significant cohort attributes are considered during the cohort selection process, enhancing the accuracy and effectiveness of the model verification.

The cohort selection unit 42 can further optionally include a selection unit 132 for selecting the subset of cohorts from the total set of cohorts stored in the cohort storage unit 46 based on the cohort attribute data 130 generated by the attribute determination unit 128. Specifically, once the cohort attributes are identified and determined, the selection unit 132 can then automatically and dynamically determine or select the subset of cohorts based on the specific cohort attributes within the cohort attribute data 130. The selection unit 42 can employ a rule-based technique or a clustering technique to determine the subset of cohorts.

According to an alternate embodiment, the cohort selection unit 42 can select the subset of cohorts based on a predefined set of cohort attributes 46 selected by the enterprise rather than based on cohort attribute data. For example, the predefined cohort attributes 46 can be predefined by the enterprise and can include for example industry domain, cohort expertise, language of the cohort, experience of the cohort including years of experience, geographic location of the cohort, geographic regulations, context, geolocation, and the skills of the cohort. Those of ordinary skill in the art will readily recognize that the predefined cohort attributes can include a subset of these attributes, additional attributes, or a different set of attributes. Further, the cohort attribute data 130 can also include one or more of these predefined cohort attributes. The cohort selection unit 42 can then select a set of cohorts based on the predefined cohort attributes. The cohort selection can also further consider, in addition to the cohort attributes, selected types of machine learning model parameters or factors, including for example the type of machine learning model and the environment in which the machine learning model is intended to operate. The information can also include a portion of the information input into the cohort determination unit 40. The cohort determination unit 40 can then generate output cohort data 48, which can include one or more of cohort selection data, cohort attribute data, and a total set of cohort data. The output cohort data 48 can be stored in the distributed trust infrastructure 12. According to the present invention, each of the cohorts selected by the cohort selection unit 42 are unaware of the selection of the other cohorts in the subset (e.g., blinded), so as to form a blind selection process. The cohort determination unit 40 in essence selects verification participants (i.e., cohorts) specifically selected to verify a selected machine learning model based on a multi-factorial set of cohort attributes that can be predefined by the enterprise. The cohort blind selection process can serve to hide the identities and details of the cohorts from other cohorts in order to promote independent and unbiased reviews or evaluations of the machine learning models by the selected cohorts.

As used herein, the terms "blind" or "blinded" can refer to a process, state, or condition in which one or more cohorts or participants involved in the verification or evaluation of a machine learning model or associated system are intentionally restricted from accessing certain information about other cohorts, model origin, or evaluation context, or are otherwise unaware of the identity or existence of the other cohorts. In particular, a blind or blinded process may include preventing selected cohorts, reviewers, or evaluators from knowing the identities, roles, attributes, existence or evaluations of other cohorts involved in the same verification task. For example, in a blinded cohort selection process, the cohort selection unit 42 may select a plurality of cohorts to evaluate a machine learning model or system based on predefined cohort or system attributes (e.g., expertise, locale, primary language, regulatory familiarity), while ensuring that each selected cohort is unaware of the identity, presence, or selection of the other cohorts. This includes hiding or abstracting metadata, communication channels, contextual signals, or selection logic that can allow cohorts to coordinate, collude, or be influenced by other cohorts. The blinded process enhances the independence, objectivity, and reliability of verification results by preventing bias, undue influence, or cross-party contamination. The cohort determination and selection process may be further configured to incorporate relevant model parameters, deployment environments, or other contextual data to assign verification participants best suited for a given task, while preserving the blinded nature of the evaluation.

The model verification system 10 of the present invention can also include an objective assessment unit 50 for assessing or determining the consistency or agreement of the verification results between or among the different blinded cohorts who are selected to verify, and possibly to evaluate, the machine learning model or system. Once the cohorts are determined and selected by the cohort determination unit 40, then each of the selected cohorts can perform or apply a verification process on or to the selected machine learning model or generative artificial intelligence system. The results of the verification process are provided to the objective assessment unit 50 by way of cohort verification data 52. The cohort verification data can be stored in the storage unit 54. As used herein, the term "verifying" or "verification" of a machine learning model or a generative artificial intelligence system by one or more cohorts is intended to refer to the systematic process conducted by the cohorts to ensure that the model or system performance, reliability, accuracy, and compliance is consistent with or satisfies predefined standards and criteria. The verification process can include a series of checks and validations performed by the cohorts to establish the suitability of the model or system for deployment in its intended application. The verification can involve an evaluation of selected performance metrics or indicators, such as accuracy, precision, recall, F1-score, area under an ROC curve (AUC-ROC), and the like. The verification can also include one or more of, or any combination of, an assessment of the ability of the model or system to maintain performance under varying conditions and inputs, an assessment of the model or system to ensure that the model or system does not exhibit unfair biases against any particular group or demographic, ensure that the decisions of the model or system can be interpreted and understood by humans, and verify that the model or system adheres to relevant regulations, standards, and ethical guidelines. As used herein, the term "verification process" can refer to a structured and systematic procedure executed by the cohort to verify, validate, and confirm the performance and integrity of the machine learning model or the generative artificial intelligence system. The process can include multiple stages, each with specific tasks and objectives, aimed at thoroughly evaluating the model or system against established verification criteria. The verification process can include, for example, establishing goals, scope, and specific objectives of the verification process, identify the cohorts, and determine a verification plan. The verification plan can include methodologies, tools, datasets, and benchmarks to be used, gather representative datasets that reflect the real-world scenarios in which the model or system is to be deployed, run the machine learning model or generative artificial intelligence system on test datasets to establish baseline performance metrics, conduct a preliminary analysis of the outputs of the model or system and identify any immediate issues or concerns. The process can also include evaluating the model or system against comprehensive test cases to measure an accuracy, precision, recall, and other relevant metrics of the model or system including bias in the predictions generated thereby, ensure the model or system adheres to industry regulations and standards, and then refine and retrain the model or system to address any identified issues. The model or system can also be re-verified or re-evaluated by the cohorts to confirm improvements in the model.

The illustrated objective assessment unit 50 can include a statistical measurement unit 56 that is configured to apply one or more statistical measuring or assessment techniques to at least the cohort verification data 52, and optionally to the output cohort data 48, in order to measure or assess the consistency and reliability of the cohort-based verification of the machine learning model or the generative artificial intelligence system performed by the cohorts. Examples of suitable statistical measuring techniques that can be employed by the statistical measurement unit include an inter-rater reliability (IRR) analysis technique, a blind index technique, a Cohen's Kappa technique, a Intraclass Correlation Coefficient technique, a Fleiss' Kappa technique, a Krippendorff's Alpha technique, and the like. According to one embodiment, the statistical measurement unit 56 receives and processes the output cohort data 48 and the cohort verification data 52 and applies a selected statistical measuring technique to the cohort verification data 52 and optionally to the output cohort data 48, to determine an assessment score 58. For example, the statistical measurement unit 56 can employ an inter-rater reliability (IRR) technique to assess the level of agreement among cohorts (e.g., consistency of the reviews or verification) who verify or assess the performance or output of the machine learning model by the cohorts forming part of the cohort verification data 52. The IRR technique is a statistical measure used to determine the consistency or agreement between different cohorts or raters who verify, evaluate, assess or score the machine learning model or the generative artificial intelligence system. The IRR technique can be configured with selected parameters or settings corresponding to the methodological and procedural aspects of the verification task, such as the rating scale used, the nature of the items being evaluated, and the number of raters. The resultant assessment score 58 can be expressed or represented as a coefficient or numerical value that quantifies or is indicative of the level or degree of agreement among the cohorts (e.g., raters).

The statistical measurement unit 56 may apply different statistical techniques based on the nature of the data and the number of cohorts involved. The assessment score 58 can be calculated using additional and different types of statistical measurement techniques depending on the type of data and the number of cohorts. For example, Cohen's Kappa can be used to evaluate inter-rater agreement between two raters for categorical or qualitative items, correcting for agreement that could occur by chance. In contrast, Fleiss' Kappa or Krippendorff's Alpha may be employed when more than two raters are involved. The assessment score 58 generated by the statistical measurement unit 56 provides a quantitative measure of inter-rater agreement, which in turn serves as an indicator of the reliability and validity of the subjective evaluations provided by the cohorts. A high assessment score 58 indicates strong consistency and reliability in the ratings, suggesting that the cohorts are well-aligned in their evaluations. Conversely, a low score may suggest the need for enhanced training, revised evaluation criteria, or refinement of the verification protocol. The statistical measurement unit 56 can optionally apply a threshold value or cutoff score against which the assessment score 58 is compared, to determine whether the evaluations are sufficiently reliable.

This threshold-based approach can function as a quality control mechanism, where assessment scores above the threshold indicate adequate agreement among the cohorts. Such techniques also reduce measurement error by identifying and mitigating random errors and individual biases, and they help ensure that the model verification process is reproducible by different cohorts under similar conditions.

According to another example, the statistical measurement unit 56 can employ a blind-index technique to verify the machine learning model or system. In one implementation, the blind-index technique involves the use of a separate, hidden dataset (e.g., a blind dataset) that is withheld from the model training and development process to provide an objective and unbiased evaluation of the model's performance. The blind dataset enables final validation of the model under conditions that simulate real-world deployment, thereby preventing overfitting and ensuring that the model's performance metrics reflect its ability to generalize to previously unseen data. In another implementation, the blind-index technique may refer to a method for secure and privacy-preserving analysis of cohort verification data. In such embodiments, the technique enables querying and statistical evaluation of the cohort-generated data without revealing sensitive or identifiable information. This privacy-preserving approach is particularly advantageous in settings where multiple independent cohorts contribute verification inputs and there is a need to maintain confidentiality during collaborative validation. The blind-index technique, whether used for data partitioning (e.g., test set isolation) or for privacy-preserving analysis, can generate one or more assessment scores 58. The assessment scores can be representative of model performance metrics, including but not limited to: accuracy, precision, recall (sensitivity), F1 score, and confusion matrix values. The assessment score 58 can be stored in the storage unit 54 and/or communicated to and stored in the distributed trust infrastructure 12 for further analysis or audit purposes.

The objective assessment unit 50 can also include a cohort setting unit 60 configured for storing and managing cohort settings data 60A. The cohort settings data 60A can be used by the statistical measurement techniques applied by the statistical measurement unit 56 to support validation and verification of the machine learning model and associated generative artificial intelligence system. The cohort settings data 60A can define the specific parameters, conditions, and criteria under which different cohorts perform the verification tasks as part of the verification process, thereby establishing a standardized, repeatable, and comprehensive assessment framework. This structured configuration enables consistent, objective, and reproducible evaluation of the model's performance across multiple cohort groups. In some embodiments, the cohort settings data 60A can include one or more verification metrics, cross-validation settings, holdout validation parameters, resampling methods, hyperparameter tuning configurations, and the like. The verification metrics can include, for example, accuracy, precision, recall, F1-score, area under the receiver operating characteristic curve (AUC-ROC), and similar performance indicators. In some implementations, a blinded cohort is responsible for verifying the machine learning model or associated AI system, operating under parameters defined by the cohort setting unit 60. The cohort setting unit 60 may provide the cohort settings data 60A, including verification metrics, to the statistical measurement unit 56. Based on these settings and the evaluations performed by the cohorts, the statistical measurement unit 56 can compute the assessment score 58. For example, the statistical measurement unit 56 can compute a blinding index score, which reflects the degree of independence between cohort attributes (e.g., demographics, professional background, affiliations) and the specific model or system under evaluation. A higher blinding index score indicates stronger cohort blinding, thereby reducing the potential for bias in the verification process. The statistical measurement unit 56 can also compute an inter-rater reliability score, such as Cohen's Kappa or the Intraclass Correlation Coefficient, to measure the level of agreement among cohort evaluations. A high inter-rater reliability score reflects consensus and objectivity in the cohort assessments.

In another embodiment, a cohort diversity score may be generated to quantify heterogeneity among cohort members based on selected attributes, including domain expertise, industry affiliation, language, cultural background, and demographic characteristics. Diversity metrics may include, for instance, Simpson's Index or Shannon's Entropy. Higher diversity scores indicate broader representativeness and help reduce bias from homogeneous perspectives.

The statistical measurement unit 56 can further compute a longitudinal performance score to track the consistency and stability of the model's performance across multiple evaluation rounds or over time. In addition, an evaluation round consistency score can be generated by comparing scores such as the blinding index, inter-rater reliability, and diversity metrics across distinct cohort panels or testing intervals. This score indicates the reproducibility and robustness of the verification process over successive evaluations. According to further embodiments, a cohort confidence score can be determined based on self-reported confidence levels provided by cohort members during the assessment process. When correlated with high inter-rater reliability, a high confidence score may serve as an additional indicator of the credibility of the evaluation results.

In some implementations, the statistical measurement unit 56 can determine a composite verification score by aggregating multiple component metrics, such as the blinding index, inter-rater reliability, diversity score, longitudinal performance trends, evaluation round consistency, and cohort confidence, into a single value representing the overall objectivity, consistency, and reliability of the verification process. The cohort setting unit 60 can further be configured to facilitate the setup, collection, analysis, and reporting of the assessment scores generated by the statistical measurement unit 56 and/or the blinded cohorts. In some embodiments, the cohort setting unit 60 can include an interface for defining cohort selection criteria and attributes, including but not limited to domain expertise, industry sector, language, cultural background, and demographic factors. This interface can support random or stratified assignment of cohorts to evaluation rounds or panels to ensure diversity, balance, and representativeness throughout the verification process.

The cohort setting unit 60 can also include or employ tools for creating verification tasks, scenarios, or test cases that the cohort employs to assess the AI system or model, which enables the development of rubrics or scoring guidelines for cohorts to rate different aspects of the AI system or model, such as performance, fairness, explainability, and robustness. The cohort setting unit 60 can also include data collection and management, which creates a secure and reliable mechanism for collecting cohort assessments, ratings, and confidence scores, while maintaining the blinding of identities and AI system or model details. The objective assessment unit thus helps store and manage the verification data, including longitudinal performance data and results from multiple verification or assessment rounds.

The objective assessment unit 50 can also include a set of trusted machine learning model principles 62 that can be optionally stored in the storage unit 54. When the statistical measurement unit 56 employs a statistical measurement technique to verify the machine learning model, adhering to trusted machine learning model principles ensures that the verification process is reliable, ethical, and robust. The trusted machine learning model principles are a set of guidelines and best practices designed to ensure that the models are developed and deployed in a manner that is fair, transparent, accountable, robust, secure, and respects user privacy and inclusivity. The principles can include, for example, a fairness and bias mitigation principle that employs a bias detection and correction technique to detect and mitigate biases in the data and machine learning model. The principle can include using fairness-aware algorithms and regularly auditing the model's predictions across different demographic groups. Further, the principles can ensure that the training and evaluation datasets are representative of diverse populations that the machine learning model serves. This can be accomplished by using stratified sampling and other techniques to maintain balance in the model. The principles can also employ fairness metrics, such as demographic parity, equal opportunity, and disparate impact, alongside traditional performance metrics.

The machine learning model principles can further include a transparency and explainability principle. The transparency and explainability principle can use interpretable models and apply explainability techniques, such as SHAP (SHapley Additive explanations) or LIME (Local Interpretable Model-agnostic Explanations) to provide insights into model decisions. The transparency and explainability principle can maintain thorough documentation of the model development process, including data sources, feature selection, and preprocessing steps, and the model's capabilities, limitations, and the context of its use to stakeholders can be clearly communicated.

The machine learning model principles can still further include an accountability and governance principle that can assign accountability for the model's performance and ethical use by establishing roles for data stewardship, model auditing, and compliance oversight. The accountability and governance principle can adhere to established ethical guidelines and industry standards for model development and deployment and can implement governance frameworks to ensure ongoing compliance. The accountability and governance principle can maintain detailed audit trails for all stages of model development, from data collection to deployment, ensuring traceability and accountability.

The machine learning model principles can also include reliability and robustness principles. The reliability and robustness principle allows the user or system to perform extensive testing under varied conditions to ensure that the model is reliable and performs well across different scenarios. This includes stress testing and adversarial testing. The reliability and robustness principle provides for conducting thorough error analysis to understand and address the model's failure modes. This helps in improving the model's robustness and reliability and can implement continuous monitoring mechanisms to track model performance over time and detect any degradation or unexpected behavior.

The machine learning model principles can still further include an inclusivity and accessibility principle. The inclusivity and accessibility principle requires that the model be configured to be inclusive and accessible to all users, considering the needs of various demographic groups, including those with disabilities. The inclusivity and accessibility principle also requires engagement with diverse stakeholders, including those who might be affected by the machine learning model, to gather input and feedback throughout the model development and deployment process.

The statistical measurement unit 56 can thus process the output cohort data 48, the cohort verification data 52, the machine learning model principles data 62A and the cohort setting data 60A when generating the assessment score 58. The assessment score can be stored in the distributed trust infrastructure 12 and optionally in the storage unit 54. Similarly, the set of trusted principles 62 can correspond principles associated with generative artificial intelligence system.

With reference again to FIG. 1, the illustrated system or model verification system 10 further includes a system or model evaluation unit 70 for evaluating either the machine learning model or the generative artificial intelligence system based on a set of enterprise specific factors or parameters. As described herein, evaluating a machine learning model or a generative artificial intelligence system refers to assessing the performance of the model or system for the intended application or purpose. Although the evaluation unit 70 can be used to evaluate the machine learning model or the generative artificial intelligence system, the evaluation unit is described as evaluating a machine learning model the sake of case and simplicity. The evaluation can involve analyzing the ability of the machine learning model to generate accurate predictions on new unseen data, and ensuring the machine learning model meets the necessary, required, or acceptable performance criteria and standards. The model evaluation also helps determine the model's performance, identify potential issues with the model, and guide improvements that can be made to the model. As used herein, the term "performance" refers to one or more measurable characteristics or behaviors of a machine learning model or generative artificial intelligence system that relate to its accuracy, reliability, robustness, and overall suitability for a defined task, operational context, or intended use case. Performance can be evaluated based on enterprise-specific evaluation parameters, regulatory requirements, application-specific criteria, or other relevant standards. Evaluating performance includes assessing the ability of the machine learning model or generative AI system to generate accurate outputs or predictions on new, previously unseen data. Performance evaluation may further involve determining whether the model satisfies minimum threshold levels, acceptable error margins, or required precision or recall metrics, among others. Additional factors considered in performance evaluation may include latency, throughput, robustness under varied conditions, consistency across deployments, and adherence to domain-specific or jurisdiction-specific standards. The evaluation of performance, as carried out by the evaluation determination unit 78, may also identify model limitations, deficiencies, or unintended behaviors that affect the trustworthiness or usability of the model. Such evaluations may guide iterative improvement or retraining processes to improve overall system reliability. In certain embodiments, performance can also reflect the alignment of the model with one or more contextual or environmental factors relevant to the deployment environment, including but not limited to language, geographic region, user population characteristics, or legal or regulatory constraints. Accordingly, performance evaluation within the present invention enables objective and reproducible assessments of whether a machine learning model or generative AI system is functionally appropriate, operationally reliable, and suitable for its intended purpose.

According to one embodiment, the evaluation process employed by the evaluation determination unit 78 can include selecting and defining evaluation criteria of the model, including performance metrics of the model (e.g., accuracy, precision, recall, F1-score, ROC-AUC, mean squared error (MSE), and R-squared, and the like), robustness (e.g., assessing the model's stability under varying conditions and data distributions), bias and fairness, interpretability (e.g., evaluate the model's transparency and ability to explain model generated predictions), and compliance. The evaluation process can also involve preparing the model data by dividing the dataset into selected types of datasets, including a training dataset, a validation dataset, and a test dataset, and then cleaning and preprocessing the data. The machine learning model can then be trained on the training datasets using suitable hyperparameters, and the hyperparameters can be tuned using selected tuning techniques, such as grid search, random search, or Bayesian optimization. The model can then be validated by using the validation datasets to fine-tune the hyperparameters and prevent overfitting. The model can then be tested with the test or evaluation datasets to assess or evaluate the performance of the model.

The illustrated model evaluation unit 70 can include an evaluation determination unit 78 for receiving and processing various model evaluation data and then generating evaluation data 82 that is indicative of the performance of the machine learning model. The performance evaluation involves assessing the model's predictions against actual outcomes using specific criteria. The model evaluation data can include, for example, test harness data, benchmarking data, evaluation ground truth data, threshold setting data, and the like. According to one embodiment, the model evaluation unit 70 can include a storage unit 74 for storing scenario-based test harness data. The scenario-based test harness data is data representative of a framework or environment that is configured to simulate real-world situations and conditions under which the machine learning model is deployed. The scenario-based test harness data when processed by the evaluation determination unit 78 provides for comprehensive testing of the machine learning model by evaluating the model's performance across a variety of scenarios that it may encounter during use. The scenario-based test harness data can include data that simulates different real-world conditions, including varying data distributions, noise levels, and edge cases. The scenario-based test harness data also allows for controlled and repeatable model testing environments where specific model variables and parameters can be adjusted systematically. The evaluation determination unit 78 can process the test harness data so as to be able to test the model with a wide range of data to cover different situations that the model may encounter during use. During testing and evaluation of the model with the scenario-based test harness data, the evaluation determination unit 78 can collect and analyze various performance metrics to evaluate the model's robustness, accuracy, precision, recall, and other relevant factors. Depending on the scenario, additional performance metrics relevant to the specific context can be collected, calculated, or determined by the evaluation determination unit 78, including response time, robustness to noise, and the like. The scenario-based test harness data can also optionally include automation tools data that enables the evaluation determination unit 78 to run tests systematically and efficiently on the machine learning model to ensure consistency and repeatability of the model. The scenario-based test harness data when processed by the evaluation determination unit 78 can provide an accurate assessment of the performance of the machine learning model in real-world applications when compared to traditional testing with static datasets. The scenario-based test harness data also enables the evaluation determination unit 78 to identify potential weaknesses and failure points of the machine learning model by exposing the model to a wide range of conditions.

The illustrated model evaluation unit 70 can also include a storage unit 72 for storing evaluation ground truth data. The evaluation ground truth data refers to the set of data used as a baseline or standard that can be processed by the evaluation determination unit 78 to assess or evaluate the performance of the machine learning model. The evaluation ground truth data can include accurate, verified, and labeled data that is considered correct and accurate and represents the correct outcomes of the machine learning model, and thus is capable of serving as reference or test data against which predictions or outputs generated by the model can be compared. When processed by the evaluation determination unit 78, the evaluation ground truth data can serve as a reliable reference to measure and evaluate the accuracy and effectiveness of the model, ensure that the model's predictions align with real-world outcomes or expert annotations, and allows for the evaluation determination unit 78 to calculate or determine selected performance metrics, such as accuracy, precision, recall, F1 score, and AUC-ROC by comparing model predictions with the evaluation ground truth data.

According to one embodiment, the evaluation determination unit 78 can compare the predictions generated by the machine learning model under evaluation with the ground truth data to identify correct and incorrect model predictions (e.g., model output). The comparison performed by the evaluation determination unit 78 helps determine if errors exist and the evaluation determination unit 78 can analyze the errors and determine where the model is making incorrect predictions. The evaluation ground truth data is highly accurate labeled data that is relatively free from errors as it serves as the standard for evaluation. The data also represents the full range of scenarios the model is likely to encounter in real-world applications. Further, the labeling or annotations in the ground truth data are consistent and standardized to ensure fair comparison.

The model evaluation unit 70 can further include a storage unit 76 configured to store benchmark data. The benchmark data refers to one or more standards, reference datasets, or performance criteria against which the machine learning model is evaluated. The benchmark data, when processed by the evaluation determination unit 78, can be used to assess the effectiveness of the model and compare the model's performance against other models or predefined performance thresholds. The benchmark data can include, but is not limited to, performance metric data, baseline model data, ground truth data, computational efficiency data, generalization and robustness data, fairness and bias metric data, explainability data, and user engagement data. The performance metric data may include quantitative indicators such as accuracy, precision, recall (or sensitivity), F1 score, area under the curve (AUC), mean squared error (MSE), root mean squared error (RMSE), and mean absolute error (MAE). Accuracy refers to the ratio of correctly predicted instances to total instances. Precision refers to the ratio of true positives to the sum of true and false positives. Recall, or sensitivity, refers to the ratio of true positives to the sum of true positives and false negatives. The F1 score represents the harmonic mean of precision and recall. AUC refers to the area under the receiver operating characteristic (ROC) curve, which indicates the trade-off between true positive rate and false positive rate. MSE measures the average squared difference between predicted and actual values, while RMSE is the square root of the MSE and provides the error in the same units as the target variable. MAE measures the average absolute difference between predicted and actual values.

The baseline model data includes performance data from one or more baseline models used for comparative evaluation and may be curated and validated to ensure correctness and consistency. Ground truth data refers to accurately labeled reference data used to evaluate model predictions and may be similar to or derived from evaluation ground truth data stored in storage unit 72. Computational efficiency benchmark data relates to the model's performance in terms of time and resource usage, including inference time (e.g., time required to make a prediction), training time (e.g., total time to train the model), memory usage (e.g., RAM or GPU memory consumed), and scalability (e.g., model performance as data or resource demands increase). Generalization and robustness data evaluate the model's ability to perform reliably on unseen data or under varying conditions. Such data can include cross-validation scores from training-validation splits and test datasets representative of different distributions, domains, or timeframes. Fairness and bias benchmark data include metrics that evaluate potential disparities in model predictions across demographic groups. These metrics may include demographic parity (equal prediction rates across groups), equalized odds (equal true and false positive rates across groups), and disparate impact ratio (ratio of favorable outcomes between groups). Explainability and interpretability benchmark data pertain to the model's transparency and the extent to which model predictions can be understood and justified. This data may be generated using interpretable models, attribution methods, or user-centric explainability techniques. Engagement metric data applies to models deployed in user-facing applications and may include user satisfaction scores and usage metrics, such as session duration, frequency of use, and user retention rates. In some embodiments, the evaluation determination unit 78 can compute an overall model evaluation score or multiple sub-scores based on the benchmark data. These scores assist in determining model readiness, identifying areas for improvement, and supporting decision-making in model selection and deployment.

The model evaluation unit 70 can further include threshold settings 79. The threshold settings 79 may include threshold data that can be received and processed by the evaluation determination unit 78 to assess the performance and behavior of the machine learning model. The threshold data can define one or more decision thresholds used to interpret the model's outputs and can influence classification, scoring, or other evaluation results. In some embodiments, the threshold data may include various types of thresholds, such as fixed thresholds, which apply a constant value across all predictions; dynamic thresholds, which adjust automatically based on factors such as data distribution, input type, or contextual variables; and cost-sensitive thresholds, which are set by taking into account the relative cost of false positives versus false negatives. The threshold data may also include class-balanced thresholds designed to compensate for imbalanced class distributions in the training or evaluation data. Additional threshold types can include metric-optimized thresholds, which are selected to maximize or improve specific evaluation metrics such as F1 score, precision, recall, or AUC-ROC; percentile-based thresholds, which are set according to a specified percentile of the predicted probability scores; and multi-threshold settings, which may be used in ensemble model configurations where individual models operate with separate thresholds and their outputs are aggregated. The threshold data may further include application-specific thresholds, which are customized for the unique operational or business requirements of a given application context. These various threshold types enable flexible and context-aware performance evaluation of the machine learning model under a variety of real-world conditions.

The evaluation determination unit 78 can include a parameter application unit 80 for applying one or more enterprise parameters, and one or more of (or two or more of) the evaluation ground truth data, scenario-based test harness data, benchmark data, and threshold setting data, to the model verification results (e.g., assessment score 58) generated by the objective assessment unit 50 so as to evaluate the performance of the machine learning model. The set of measurable attributes can be compared or processed with the enterprise parameters. The parameter application unit 80 can include any selected parameters associated with or defined by the enterprise. The enterprise parameters can include, by simple way of example, fairness, one or more of, or any combination of, reliability, transparency, security, accountability, safety, privacy, explainability, integrity, and sustainability. Additional or different parameters can include one or more of security firewall and attack prevention parameters, malicious detection parameters, code leakage parameters, prompt injection protection parameters, adversarial protection parameters, malware analysis parameters, vulnerability assessment parameters, backdoor detection parameters, model integrity parameters, harmful content related parameters, fail safe mechanism parameters, sensitive data protection parameters, intellectual property related parameters, personal data collection related parameters, data completeness related parameters, data quality parameters, data bias parameters, data provenance parameters, solution bias related parameters, machine learning model logic related parameters, model accuracy related parameters, drift and stability related parameters, energy efficiency parameters, and the like. The parameter application unit 80 can further process the assessment score 58 in light of one or more of the enterprise parameters. The evaluation determination unit 78 can then generate output model evaluation data 82 indicative of an evaluation of the performance of the machine learning model. The output model evaluation data 82 can be stored in the distributed trust infrastructure 12.

The model verification system 10 can further include a result assessment unit 90 for further assessing the evaluation results in the form of the output model evaluation data 82 generated by the model evaluation unit 70. The result assessment unit 90 can automatically review or assess the performance and reliability of the output model evaluation data 82 or can include or employ a cohort or other type of reviewer to review the output model evaluation data 82, so as to further assess and review the performance and reliability of the machine learning model or associated generative AI system. According to one embodiment, the result assessment unit 90 can include an independent evaluation unit 92 that independently evaluates and assesses the performance and reliability of the machine learning model or system using a separate, unbiased set of data (e.g., dataset) or through external review by the reviewer to ensure objective and reliable model results. As used herein, the term "reliable" or "reliability" in this context encompasses accuracy, consistency, generalizability, robustness, fairness, reproducibility, and validity, thus ensuring that the results of the machine learning model or system are trustworthy and dependable when applied to new, unbiased data. Specifically, in terms of consistency, the machine learning model or system generates similar results across different data runs or data samples in order to demonstrate stability and repeatability in the performance of the model. In terms of accuracy, the predictions generated by the model or system closely match the true outcomes or labels in the dataset, indicating high precision and correctness. In terms of generalizability, the model performs well not only on the training data but also on new, unseen data (the separate unbiased dataset), showing that the model can generalize beyond the specific instances the model was trained on. In terms of robustness, the model or system can maintain performance across different subsets of data and under various conditions, suggesting model resilience to variations and potential data noise. In terms of fairness, the model or system does not exhibit significant bias or unfair treatment across different groups or categories within the dataset, ensuring equitable performance. In terms of reproducibility, the process and methodology used to train and evaluate the model or system can be replicated by others, leading to similar results, which supports the credibility of the findings. In terms of validity, the predictions generated by the machine learning model or associated system are meaningful and relevant in the real-world context for which the model was developed. Moreover, the independent evaluation performed by the reviewer provides an unbiased evaluation of the model or system performance free from any influence of the data used during the model training and development phases and ensures that the machine learning model or system generalizes well to new, unseen data. The independent evaluation also helps identify and mitigate any biases or overfitting that may have occurred during the model training process, thus ensuring that the machine learning model performs well across diverse datasets.

The result assessment unit 90 can also optionally include a scenario evaluation unit 94 for assessing the performance of the model or system under various predefined conditions or scenarios that simulate real-world or real time conditions or situations. The evaluations help ensure the model or system exhibits robustness, reliability, and effectiveness across different contexts the model may encounter in actual deployment.

The result assessment unit 90 further optionally includes a peer evaluation unit 96 for assessing the model or system outputs by independent experts or peers with relevant or selected expertise. The peer evaluation provides an objective and comprehensive review of the machine learning model and model results or the generative AI system. The peer evaluations serve to generate unbiased feedback or assessments from peers who are not involved in the development of the model or system, while ensuring that the model or system meets high standards of quality, rigor, and scientific validity. The peer evaluations help identify potential errors or biases that the original model or system developers may have overlooked.

The result assessment unit 90 can also include a peer comparison unit 98 for assessing the performance of the model or system by comparing the model or system to other machine learning models or systems or benchmarks. The peer evaluation unit 96 can provide an interface and allow for analyzing the evaluation results from all of the model evaluations or findings. The peer evaluation unit 96 can highlight discrepancies, areas of agreement or disagreement. The peer evaluation unit 96 can maintain anonymity or blinding of cohort identities during the peer evaluation process to ensure objectivity. The peer comparison unit 98 can compare and analyze the peer evaluations and assessments submitted by different evaluators or cohorts. The peer comparison unit 98 employs one or more statistical techniques, such as calculating inter-rater agreement metrics, clustering algorithms, and longitudinal trend analysis, to identify areas of convergence, divergence, and potential biases among the assessments of the cohorts, enabling the identification of significant discrepancies that may require further investigation or arbitration. The peer comparison unit 98 can also generate visualizations or reports that highlight the degree of alignment or disagreement among evaluators for different aspects of the AI system or model evaluation. The peer comparison unit 98 can also employ or apply an inter-rater arbitration technique for resolving disagreements or conflicts among evaluators or cohorts when significant discrepancies are identified and adjudicate the conflicting evaluations. The peer comparison unit 98 allows the system to maintain audit trails and documentation of the arbitration process and outcomes for accountability and traceability. The peer comparison helps determine the relative strengths and weaknesses of the machine learning model or system and provides context for the model performance. The per comparison measures the model's performance against established benchmarks or peer or other models, and the peer comparison provides context to the model's performance, thus making it easier to understand the strengths and weaknesses of the model.

The result assessment unit 90 can further optionally include an inter-rater arbitration unit 100 for evaluating the machine learning model or system to resolve discrepancies or inconsistencies in the ratings or evaluation of the machine learning model or system by different cohorts or evaluators. When multiple cohorts are involved in labeling data or assessing model performance, the cohorts may not always agree on the model or system outcomes. The inter-rater arbitration addresses any potential disagreements to achieve a more reliable and accurate model evaluation. The inter-rater arbitration ensures that the evaluation criteria are applied uniformly across different cohorts, thus leading to consistent model or system results and enhancing the quality and reliability of the labeled data (e.g., training data and validation data). The result assessment unit 90 can generate assessment results 102 that are stored in the distributed trust infrastructure 12.

The model verification system 10 can include a system or model trust card generation unit 110 for generating a model trust card 112 or a system trust card from selected data that is stored in the distributed trust infrastructure 12. As used herein, the "model trust card" can refer to a document or digital artifact that provides detailed information about characteristics, performance, reliability, and/or trustworthiness information or metrics of one or more machine learning models. The model trust card can be configured or designed to enhance transparency and to facilitate trust by offering stakeholders a comprehensive overview of the machine learning model, including the intended use, limitations, performance metrics, ethical considerations, and any potential biases of the machine learning model. The model trust card can display or include any selected combination of model specific information of the verified and evaluated models, including for example the model name and version, model developer information, model purpose, scope and limitations of the model, training data information including a description of the data used to train the model (e.g., data sources, collection methods, and preprocessing steps), verification and evaluation information, validation and test information including details about the datasets used for validation and testing, and performance metrics information including accuracy, precision, recall, and F1 Score. The model trust card can also display bias mitigation information, fairness metric information directed to results of any fairness assessments, model interpretability information, feature importance information, audit and monitoring information, data privacy information, and security protocol information. The model trust card 112 provides a clear and detailed understanding of the machine learning model, making it easier for stakeholders in an enterprise to review the model specific information set forth therein, and to make selection decisions based on the results of the verification and evaluation processes, and associated assessments. The model trust card as such enables the enterprise to make informed decisions about which models to adopt based on the information set forth in the model trust card.

As used herein, the "system trust card" can refer to a document or digital artifact that provides detailed information about characteristics, performance, or trustworthiness information or metrics of a generative AI system that can employ one or more machine learning models. The trust card can be configured or designed to enhance transparency and to facilitate trust by offering stakeholders a comprehensive overview of the system, including the intended use, limitations, performance metrics, ethical considerations, and any potential biases of the machine learning model. The system trust card can display or include any selected combination of system specific information, including for example the machine learning model name and version, system and model developer information, system and model purpose, scope and limitations of the system and model, training data information including a description of the data used to train the model (e.g., data sources, collection methods, and preprocessing steps), validation and test information including details about the datasets used for validation and testing, and performance metrics information including accuracy, precision, recall, and F1 Score. The system trust card can also display bias mitigation information, fairness metric information directed to results of any fairness assessments, model interpretability information, feature importance information, audit and monitoring information, data privacy information, and security protocol information. The system trust card can provide a clear and detailed understanding of the system, making it easier for stakeholders or reviewers to trust and adopt the system. Further, the system trust card provides a clear and detailed understanding of the generative AI system, making it easier for stakeholders in an enterprise to review the system specific information set forth therein, and to make selection decisions based on the results of the verification and evaluation processes, and associated assessments. The system trust card as such enables the enterprise to make informed decisions about which systems to adopt based on the information set forth in the system trust card.

The system or model trust card generation unit 110 can also include a storage unit 114 that can store the model trust cards 112 or the system trust card. The storage unit 114 can be a specialized repository used to store the model and systems trust cards and to track and manage machine learning models and generative AI systems over time, capturing various aspects of model or system development, deployment, performance, and updates. The purpose of the storage unit 114 is to maintain a record of various versions of the machine learning models and systems, also store including updates, changes, and improvements over time. The storage unit 114 can also store data associated with the monitoring and logging of model performance metrics in different environments and across various time periods. The storage unit 114 can also store decisions, changes, and performance outcomes of the machine learning model. The storage unit 114 can also store and provide the necessary data for generating the model trust card 112, which summarizes the trustworthiness, reliability, and performance of the machine learning model.

The present invention is thus directed to a system and method for continuous blinded verification of machine learning models under real-world conditions that changes temporally and geographically. The model verification system 10 of the present invention initially employs a model aggregation unit 20 to collate and aggregate together the machine learning models associated with an enterprise. The models can have associated therewith metadata. The aggregated machine learning models can be stored in the distributed trust infrastructure 12, which can include a blockchain.

The model verification system 10 can then employ a cohort determination unit 40 for determining a plurality of cohorts that can be used to verify the machine learning model based on multi-factorial cohort attributes, including for example industry domain, skills, locale, expertise, primary language, years of experience, and the like. The cohort determination unit 40 also considers the context, geolocation, circumstances, geo-specific regulations, and the environment in which the machine learning model will run. The cohorts that are selected to verify the machine learning model can be passed along to an objective assessment unit 50 so that the cohorts can verify the machine learning model. The cohorts can also be stored in the distributed trust infrastructure 12.

The model verification system 10 of the present invention can also include an objective assessment unit 50 for having the plurality of cohorts perform a verification process on the machine learning model. The verification process performed by the cohorts can utilize and process the machine learning model, cohort settings, and cohort verification data 52. The cohorts are unaware of each other so as to form a blind verification process that promotes independent and unbiased individual evaluations of the machine learning model. The multiple blinded cohorts improve the verification process of the machine learning model by preventing bias and influence from any one source when verifying the model. Further, the cohort determination unit 50 can employ a statistical measurement unit 56 that can apply one or more statistical measurement techniques, such as blinding index and inter-rater reliability, to generate an assessment score that helps determine if the verification process performed by each of the cohorts is objective and consistent. The performance of the machine learning model is also tracked through electronic model trust cards that capture or display selected and customizable model information. According to one embodiment, the machine learning model can be verified multiple times by the same set of cohorts or by a different set of cohorts. Further, the blinded verification process can track and report a blinding index statistic to quantitatively measure the degree to which the cohorts and model details are effectively blinded from each other. A high blinding index score indicates independence between the cohorts and model. The verification process can also generate or analyze confidence scores from the cohorts on different verification aspects. The consistency in the confidence levels or scores, as measured by inter-rater agreement, lend credibility to model results. The assessment score generated by the objective assessment unit 50 can be stored in the distributed trust infrastructure 12 and can also be conveyed to a model valuation unit 70.

The model evaluation unit 70 of the present invention can then evaluate the machine learning model based on selected data and based on selected enterprise parameters. The evaluation can be performed by cohorts or automatically by the same cohorts that performed by the verification process, or by a different set of cohorts. The model evaluation unit 70 can thus employ the assessment scores and selected additional data, such as ground truth data, benchmark data, test harness data, and threshold setting data to evaluate the model performance and effectiveness. The model evaluation unit 70 can employ a parameter application unit 80 to process the data based on selected enterprise specific parameters, such as for example Fairness, Transparency, Explainability, Accountability, Data Integrity, Reliability, Security, Safety, Privacy, and Sustainability. The cohorts can also independently evaluate the machine learning model based on the enterprise parameters. The model evaluation unit 70 can then generate output model evaluation data 82 that can be stored in the distributed trust infrastructure 12 and can be conveyed to a result assessment unit 90.

In this regard, the result assessment unit 90 can include a statistical measurement unit 100, such as an inter-rater arbitration unit, that can receive and process the output model evaluation data 82 that includes data from the cohorts acting as evaluators to determine or calculate assessment results 102. The assessment results 102 can include an evaluation score, such as an inter-rater reliability statistic score, like a Cohen's Kappa score. A high evaluation score suggests consistent evaluations by the cohorts. The result assessment unit 90 assesses the effectiveness and reliability of the evaluation process, ensuring that the assessments and findings provided by the cohorts are objective, consistent, and trustworthy. The result assessment unit 90 can be configured to validate the objectivity and independence of the evaluations by analyzing the degree of agreement or disagreement among the evaluators or cohorts through, for example, inter-rater reliability metrics and peer comparisons. The result assessment unit 90 can also measure and identify potential biases, inconsistencies, or outliers in the evaluations by comparing evaluator or cohort assessments across different subgroups, attributes, or evaluation rounds. The result assessment unit 90 can help resolve conflicts or significant discrepancies among cohorts through, for example, the inter-rater arbitration component, ensuring that the final assessment is reconciled and reflects a consensus or adjudicated outcome.

The machine learning model can be further tested and evaluated under different operating scenarios, contexts, geographic locations, temporal conditions (e.g. time of day/week), regulatory environments, and the like to evaluate the robustness and adaptability over time of the model. Further, the machine learning model can be verified and/or evaluated in multiple rounds by different cohorts selected based on their attributes. The system can compare blinding index and inter-rater reliability scores across the different rounds to validate independence and reproducibility of model results.

According to another embodiment, disagreements between cohort verifications and evaluations can be stored in the distributed trust infrastructure 12. The disagreements can be resolved through facilitated discussion while maintaining blindness. Subsequent consensus ratings can then be determined. The model verification system 10 can also include a model trust card generation unit 110 for generating a model trust card 112. The model trust card 112 can have any selected configuration and can display any of the data or information stored in the distributed trust infrastructure 12 and generated by the portions of the model verification system 10. The model trust card 112 can be predefined or preconfigured to display selected types of information or can be customized to display user preferred data. The model trust card 112 can be stored in the distributed trust infrastructure 12. According to one embodiment, the model trust card can be stored as a non-fungible token (NFT) on the blockchain.

As generative AI systems and machine learning models are increasingly deployed, it is desirous to document details about the systems performance and history over time. According to one embodiment, the system or model trust card generation unit 110 can create, maintain, and update model trust cards 112 and system trust cards that include information documenting or recording details of generative AI systems and models, including how the system or model operates over time. The model trust card 112 can be a comprehensive collection of the specific machine learning models that are gathered over a period of time, such as over an extended period of time. The system trust card can also be a comprehensive collection of the specific generative AI system that is gathered over a period of time. The model trust card 112 can include all aspects of the machine learning model or of a system employing the model. The model trust card 112 can be a longitudinal model trust card 112 since the card can be used to document the continuity and temporal aspects of the model. As such, the model information can be collected, maintained, and analyzed over a long period of time, rather than being a snapshot of a single moment. The continuous accumulation of model or system information allows the user to track changes and trends in the performance of the model or system, providing a completer and more accurate picture of the overall model.

The model trust card generation unit 110 can create the model trust card 112 that longitudinal tracks and dynamically evaluates generative AI systems and machine learning models, including their adaptations to different contexts. The model trust card 112 can store information and evaluation metrics of the models over time, based on dynamic, multi-party blinded evaluations across selected enterprise parameters, such as, for example, the fairness, transparency, explainability, accountability, data integrity, reliability, security, safety, privacy, and sustainability parameters. The model trust card 112 can be dynamically updated as the models evolve, adapt, and migrate over time. The information in the model trust card 112 can include model performance, model changes, evaluations of the model, and adaptations and trustworthiness. The model trust card 112 can also store or set forth information on the context-specific adaptations and adjustments in the model, in both real-time and temporal situations, to provide a comprehensive understanding of the model's performance in diverse application scenarios. The model trust card 112 thus captures and stores the results of continuous multi-stakeholder blinded verification of AI systems and machine learning models across selected enterprise parameters and performed under different operating conditions over time. The model information can be displayed in any selected format. The same applies to the creation of the system trust card.

FIG. 3 is an example of a suitable model trust card 112. The model trust card 112 can include information associated with a selected machine learning model, such as name, description, purpose, owner, classification, current version, deployment date, first trained date, last trained date, status, and the like. The model trust card 112 can have a unique identifier associated with each piece of information. The model trust card 112 can receive selected types of information 116 that help form the details of the model trust card 112. The model information 116 that is employed to form the model trust card 112 can include model or model related information from a number of different sources, from model performance data, training data including training-run data, security data, model history data, model snapshot data, model requirements data, policy data, model deployment data, model evaluation data including evaluation results and evaluation criteria, subject matter expert data, AI system card data, stakeholder information, deployment information, subject matter expert information, security data, model historical information, and the like. The same applies to the system trust card. The model and system trust cards can have any selected format or structure. According to one embodiment, the trust card can have a tabular format.

The verification and evaluation of the machine learning models and the generative AI systems enables the system to employ and deploy models and systems that are effective for the intended purposes of the enterprise. This avoids deploying models in systems that are ineffective and hence unreliable. By avoiding the use and deployment of ineffective and unreliable models, the model verification system 10 can efficiently employ processing and computing resources, and hence improve the overall function and operation of the system.

In modern computing environments, the deployment of machine learning models an generative AI systems often involves substantial computational overhead, particularly when multiple candidate models must be verified, evaluated, selected, and/or operationalized. The present system 10 addresses these challenges by providing a technical solution that automatically and efficiently selects and deploys reliable and high-performing models in a way that improves the operation and functioning of the underlying computing infrastructure. Rather than manually evaluating model performance or relying on arbitrary deployment heuristics, the system 10 implements a structured and scalable approach to model and system selection based on dynamic evaluation of model performance, contextual operating parameters, and resource constraints.

At the core of the system is a model evaluation and selection engine and associated units that apply a set of machine-implemented techniques to determine the suitability of each model within a candidate pool of models. The verification and evaluation techniques include not only accuracy-based metrics but also computational cost assessments, latency considerations, and robustness to variable data conditions. By applying these selection criteria in real time or near-real time, the system 10 ensures that only models that are suitable for their intended purpose also meet predefined performance thresholds and resource profiles, and hence are selected for deployment. This enables the computing system to dynamically optimize model usage in accordance with available hardware capabilities and system objectives.

Importantly, the present system 10 provides improvements to the functioning of a computer itself, in contrast to merely automating a mental process or applying abstract mathematical models. For example, by selectively deploying only high-performing models, the system reduces unnecessary processor cycles, memory consumption, and power usage associated with maintaining or invoking suboptimal models. The system 10 may also deactivate or offload less efficient models, thereby freeing system resources for other computational tasks. These are not generic improvements, but rather specific enhancements to the operation and efficiency of computing hardware in machine learning deployment contexts. Furthermore, the claimed invention integrates with existing machine learning pipelines and modifies their behavior in a concrete and useful way. Rather than indiscriminately applying every available model to incoming data, the system verifies and evaluates models that are optimally suited for the intended purpose.

The technical features of the invention go beyond mere data manipulation or information display. The system executes specific technical steps involving data structuring, metric computation, and decision logic that are not routine or conventional in the field. For example, the system may track model behavior across distributed environments, compute time-series based drift metrics, or apply cost-sensitive tradeoffs during model arbitration. These steps are implemented via computer-executable components that materially improve the technical process of model deployment.

It is to be understood that although the present invention has been described above in terms of particular embodiments, the foregoing embodiments are provided as being illustrative only and are not intended to limit or define the scope of the invention. Various other embodiments, including but not limited to those described herein are also within the scope of the claims and current invention. For example, the foregoing elements, units, modules, tools, models, and components described herein may be further divided into additional components or sub-components or units or joined together to form fewer components for performing the same functions.

Any of the functions disclosed herein may be implemented using means for performing those functions. Such means include, but are not limited to, any of the components or units disclosed herein, as well as known electronic and computing devices and associated components.

The techniques described herein may be implemented, for example, in hardware, one or more computer programs tangibly stored on one or more computer-readable media, firmware, hardware or any combination thereof. The techniques described herein may be implemented in one or more computer programs executing on (or executable by) a programmable computer or electronic device having any combination of any number of the following: a processor, a storage medium readable and/or writable by the processor (including, for example, volatile and non-volatile memory and/or storage elements), memory, an input device, an output device, and a display. Program code may be applied to input entered using the input device to perform the functions described and to generate output using the output device. The units and subsystems of the model verification system 10 can be implemented by suitable electronic devices.

The term computing device or electronic device as used herein can refer to any device, such as a computer, smart phone, server and the like, that includes a processor and a computer-readable memory or storage capable of storing computer-readable instructions, and in which the processor is capable of executing the computer-readable instructions in the memory. The terms electronic device, computer, computer device and system and computing device or system refer herein to a system containing one or more computing or electronic devices that are configured to implement one of more units, modules, or components of the system 10 of the present invention.

Embodiments of the present invention include features which are only possible and/or feasible to implement with the use of one or more computers or servers, processors, and/or other elements of a computer or server system. Such features are either impossible or impractical to implement mentally and/or manually. For example, embodiments of the present invention may operate on digital electronic processes which can only be created, stored, modified, processed, and transmitted by computing devices and other electronic devices having suitable processors and memory elements. Such embodiments, therefore, address problems which are inherently computer-related and solve such problems using computer technology in ways which cannot be solved manually or mentally by humans.

Any claims herein which by implication or affirmatively require an electronic device such as a computer or server, a processor, a memory, storage, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claims herein which recite that the claimed method is performed or implemented by a computer, a processor, a memory, and/or similar computer-related element, is intended to, and should only be interpreted to, encompass methods which are performed by the an electronic device or computer-related element(s). Such a method claim should not be interpreted, for example, to encompass a method that is performed mentally or by hand (e.g., using pencil and paper). Similarly, any product or computer readable medium claim herein which recites that the claimed product includes a computer, a processor, a memory, and/or similar computer-related element, is intended to, and should only be interpreted to, encompass products which include the computer-related element(s). Such a product claim should not be interpreted, for example, to encompass a product that does not include computer-related element(s).

Embodiments of the present invention solve one or more problems that are inherently rooted in computer technology. For example, embodiments of the present invention solve the problem of how to effectively verify and evaluate machine learning models and generative AI systems. There is no analog to this problem in the non-computer environment, nor is there an analog to the solutions disclosed herein in the non-computer environment.

Furthermore, embodiments of the present invention represent improvements to computer and communication technology itself. For example, the system 10 of the present can optionally employ a specially programmed or special purpose computer in an improved computer system, which may, for example, be implemented within a single computing device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage or memory device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements can also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

It should be appreciated that various concepts, systems and methods described above can be implemented in any number of ways, as the disclosed concepts are not limited to any particular manner of implementation or system configuration. Examples of specific implementations and applications are discussed herein are primarily for illustrative purposes and for providing or describing the operating environment of the system of the present invention. The system 10 and/or elements or units thereof can employ one or more electronic or computing devices, such as one or more servers, clients, computers, laptops, smartphones and the like, that are networked together, or which are arranged so as to effectively communicate with each other. The network can be any type or form of network. The devices can be on the same network or on different networks. In some embodiments, the network system may include multiple, logically grouped servers. In one of these embodiments, the logical group of servers may be referred to as a server farm or a machine farm. In another of these embodiments, the servers may be geographically dispersed. The electronic devices can communicate through wired connections or through wireless connections. The clients can also be generally referred to as local machines, clients, client nodes, client machines, client computers, client devices, endpoints, or endpoint nodes. The servers can also be referred to herein as servers, server nodes, or remote machines. In some embodiments, a client has the capacity to function as both a client or client node seeking access to resources provided by a server or server node and as a server providing access to hosted resources for other clients. The clients can be any suitable electronic or computing device, including for example, a computer, a server, a smartphone, a smart electronic pad, a portable computer, and the like. The system 10 or any associated units or components of the system can employ one or more of the illustrated computing devices and can form a computing system. Further, the server may be a file server, application server, web server, proxy server, appliance, network appliance, gateway, gateway server, virtualization server, deployment server, SSL VPN server, or firewall, or any other suitable electronic or computing device, such as the electronic device. In one embodiment, the server may be referred to as a remote machine or a node. In another embodiment, a plurality of nodes may be in the path between any two communicating servers or clients.

I claim:

1. A computer-implemented model verification system for verifying and evaluating a machine learning model in an enterprise, comprising
   a model aggregation unit for aggregating together a plurality of the machine learning models associated with the enterprise, wherein each of the plurality of machine learning models have metadata associated therewith,
   a cohort determination unit for determining and selecting a plurality of cohorts from a set of cohorts according to one or more cohort attributes to perform a verification process on one or more of the plurality of machine learning models to verify the one or more machine learning models and to generate cohort verification data, wherein the plurality of cohorts are blinded relative to each other, and wherein the cohort determination unit generates output cohort data indicative of the plurality of cohorts,
   an objective assessment unit for assessing a consistency between the plurality of cohorts when verifying one or more of the plurality of machine learning models based on the cohort verification data and the output cohort data and generating an assessment score that is indicative of a selected level of consistency of the cohort verification data between the plurality of cohorts,
   a model evaluation unit for applying an evaluation process to the assessment score and to model evaluation data for evaluating a performance of the machine learning model and for generating output model evaluation data indicative of the evaluation of the performance of the machine learning model,
   a result assessment unit for receiving and processing the output model evaluation data and for automatically assessing the performance and reliability of the machine learning model based on the output model evaluation data and for generating assessment results,
   a digital trust infrastructure having a blockchain for storing the machine learning models and associated metadata, the plurality of cohorts and output cohort data, the assessment score, the output model evaluation data, and the assessment results, and
   a model trust card generation unit for generating a model trust card from selected data stored in the digital trust infrastructure, wherein the model trust card sets forth model specific information of the machine learning models that are verified and evaluated.

2. The computer-implemented system of claim 1, wherein the model aggregation unit comprises a storage unit for storing the machine learning models and associated metadata.

3. The computer-implemented system of claim 2, wherein the cohort determination unit comprises
   a cohort storage unit for storing the set of cohorts and the cohort attributes, and
   a cohort selection unit for selecting the plurality of cohorts from the set of cohorts based on the cohort attributes, wherein the cohort attributes are selected from a total set of cohort attributes.

4. The computer-implemented system of claim 3, wherein the cohort selection unit comprises an attribute data extraction unit for applying an analytical technique to input data for extracting the cohort attributes from the input data to form the total set of cohort attributes, an attribute ranking unit for ranking the total set of cohort attributes based on selection criteria, wherein the attribute ranking unit generates ranked cohort attribute data, an attribute determination unit for determining the plurality of cohort attributes from the total set of cohort attributes based on the ranked cohort attribute data, and a selection unit for selecting the plurality of cohorts from the total set of cohorts based on the plurality of cohort attributes.

5. The computer-implemented system of claim 3, wherein the cohort selection unit is configured for selecting the plurality of cohorts based on a predefined set of cohort attributes.

6. The computer-implemented system of claim 3, wherein the objective assessment unit comprises a statistical measurement unit for applying one or more statistical measuring techniques to one or more of the output cohort data and the cohort verification data to generate the assessment score.

7. The computer-implemented system of claim 3, wherein the objective assessment unit comprises a statistical measurement unit for applying a blind-index technique to one or more of the output cohort data and the cohort verification data to determine the assessment score, wherein the blind-index technique employs a blind dataset to evaluate the machine learning model.

8. The computer-implemented system of claim 3, wherein the objective assessment unit comprises a statistical measurement unit for applying an inter-rater reliability (IRR) technique to the output cohort data and the cohort verification data to assess a level of agreement among the plurality of cohorts.

9. The computer-implements system of claim 3, wherein the model evaluation unit comprises an evaluation determination unit for evaluating the machine learning model based on the model evaluation data, wherein the model evaluation data includes one or more of evaluation ground truth data, test harness data, benchmark data, and threshold setting data.

10. The computer-implemented system of claim 9, wherein the evaluation determination unit compares predictions generated by the machine learning model with the evaluation ground truth data to identify incorrect model predictions.

11. The computer-implemented system of claim 10, wherein the evaluation determination unit analyzes incorrect model predictions generated by the machine learning model to determine if the machine learning model is generating erroneous predictions.

12. The computer-implemented system of claim 11, wherein the evaluation ground truth data comprises labeled data that is free from errors.

13. The computer-implemented system of claim 10, wherein the evaluation determination unit evaluates the machine learning model by testing a performance of the machine learning model based on the test harness data.

14. The computer-implemented system of claim 13, wherein the evaluation determination unit assesses an effectiveness of the machine learning model and compares the model with one or more other machine learning models based on benchmark data.

15. The computer-implemented system of claim 9, wherein the evaluation determination unit comprises a parameter application unit for applying one or more enterprise parameters, and one or more of the evaluation ground truth data, the scenario-based test harness data, the benchmark data, and the threshold setting data, to the assessment score generated by the objective assessment unit so as to evaluate the performance of the machine learning model.

16. The computer-implemented system of claim 15, wherein the result assessment unit comprises one or more of an independent evaluation unit for independently evaluating the performance of the machine learning model based on the output model evaluation data using a separate dataset to ensure reliable results of the machine learning model, a scenario evaluation unit for assessing the performance of the machine learning model under one or more predefined scenarios that simulate real time scenarios, a peer evaluation unit for assessing the output model evaluation data by one or more peers with selected expertise to identify bias or error in an output of the machine learning model, a peer comparison unit for assessing the performance of the machine learning model by comparing the output of the machine learning model to outputs of one or more other machine learning models, and an inter-rater arbitration unit for evaluating the machine learning model to resolve inconsistencies in ratings of the machine learning model by different cohorts using an inter-rater technique.

17. A computer-implemented method for verifying and evaluating a machine learning model in an enterprise, comprising aggregating together with a model aggregation unit a plurality of the machine learning models associated with the enterprise, wherein each of the plurality of machine learning models have metadata associated therewith, determining and selecting with a cohort determination unit a plurality of cohorts from a set of cohorts according to one or more cohort attributes to perform a verification process on one or more of the plurality of machine learning models to verify the one or more machine learning models and to generate cohort verification data, wherein the plurality of cohorts are blinded relative to each other, and then generating output cohort data indicative of the plurality of cohorts, assessing with an objective assessment unit a consistency between the plurality of cohorts when verifying one or more of the plurality of machine learning models based on the cohort verification data and the output cohort data and generating an assessment score that is indicative of a selected level of consistency of the cohort verification data between the plurality of cohorts, applying with a model evaluation unit an evaluation process to the assessment score and to model evaluation data for evaluating a performance of the machine learning model and for generating output model evaluate on data indicative of the evaluation of the performance of the machine learning model, receiving and processing with a result assessment unit the output model evaluation data and for automatically assessing the performance and reliability of the machine learning model based on the output model evaluation data and for generating assessment results, storing in a digital trust infrastructure having a blockchain the machine learning models and associated metadata, the plurality of cohorts and output cohort data, the assessment score, the output model evaluation data, and the assessment results, and generating with a model trust card generation unit a model trust card from selected data stored in the digital trust infrastructure, wherein the model trust card sets forth model specific information of the machine learning models that are verified and evaluated.

18. The computer-implemented method of claim 17, further comprising selecting with a cohort selection unit of the cohort determination unit the plurality of cohorts from the set of cohorts based on the cohort attributes, wherein the cohort attributes are selected from a total set of cohort attributes, and selecting with the cohort selection unit the plurality of cohorts based on a predefined set of cohort attributes.

19. The computer-implemented method of claim 18, further comprising applying an analytical technique to input data for extracting the cohort attributes from the input data to form the total set of cohort attributes, ranking the total set of cohort attributes based on selection criteria, wherein the attribute ranking unit generates ranked cohort attribute data, determining the plurality of cohort attributes from the total set of cohort attributes based on the ranked cohort attribute data, and selecting the plurality of cohorts from the total set of cohorts based on the plurality of cohort attributes.

20. The computer-implemented method of claim 18, further comprising applying with a statistical measurement unit of the objective assessment unit (a) one or more statistical measuring techniques to one or more of the output cohort data and the cohort verification data to generate the assessment score, or (b) a blind-index technique to one or more of the output cohort data and the cohort verification data to determine the assessment score, wherein the blind-index technique employs a blind dataset to evaluate the machine learning model, or (c) an inter-rater reliability (IRR) technique to the output cohort data and the cohort verification data to assess a level of agreement among the plurality of cohorts.

21. The computer-implements method of claim 18, further comprising, with the model evaluation unit, evaluating the machine learning model based on the model evaluation data, wherein the model evaluation data includes one or more of evaluation ground truth data, test harness data, benchmark data, and threshold setting data, wherein the evaluation ground truth data comprises labeled data that is free from errors, comparing predictions generated by the machine learning model with the evaluation ground truth data to identify incorrect model predictions, and analyzing incorrect model predictions generated by the machine learning model to determine if the machine learning model is generating erroneous predictions.

22. The computer-implemented method of claim 21, further comprising evaluating the machine learning model by testing a performance of the machine learning model based on the test harness data, and assessing an effectiveness of the machine learning model by comparing the model with one or more other machine learning models based on benchmark data.

23. The computer-implemented method of claim 22, further comprising applying one or more enterprise parameters, and one or more of the evaluation ground truth data, the scenario-based test harness data, the benchmark data, and the threshold setting data, to the assessment score generated by the objective assessment unit to evaluate the performance of the machine learning model.

24. The computer-implemented method of claim 23, further comprising one or more of independently evaluating the performance of the machine learning model based on the output model evaluation data using a separate dataset to ensure reliable results of the machine learning model, assessing the performance of the machine learning model under one or more predefined scenarios that simulate real time scenarios, assessing the output model evaluation data by one or more peers with selected expertise to identify bias or error in an output of the machine learning model, assessing the performance of the machine learning model by comparing the output of the machine learning model to outputs of one or more other machine learning models, and evaluating the machine learning model to resolve inconsistencies in ratings of the machine learning model by different cohorts using an inter-rater technique.

* * * * *